US011829971B2

United States Patent
Braathen et al.

(10) Patent No.: US 11,829,971 B2
(45) Date of Patent: Nov. 28, 2023

(54) METHODS AND SYSTEMS FOR INTENT-BASED ATTRIBUTION SCHEDULE

(71) Applicant: Block, Inc., San Francisco, CA (US)

(72) Inventors: Joachim Braathen, Oslo (NO); Enrico Trucco, Oslo (NO); Henrik Woie, Oslo (NO); Carol Abs, Oslo (NO); Johann Eriksen, Oslo (NO); Simen Smith Aulie, Oslo (NO)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/964,712

(22) Filed: Oct. 12, 2022

(65) Prior Publication Data

US 2023/0116961 A1    Apr. 20, 2023

Related U.S. Application Data

(60) Provisional application No. 63/256,478, filed on Oct. 15, 2021.

(51) Int. Cl.
*G06Q 20/12* (2012.01)
*G06Q 20/32* (2012.01)
*G06Q 20/10* (2012.01)

(52) U.S. Cl.
CPC ......... *G06Q 20/127* (2013.01); *G06Q 20/102* (2013.01); *G06Q 20/3267* (2020.05)

(58) Field of Classification Search
CPC . G06Q 20/127; G06Q 20/3267; G06Q 20/102

(Continued)

(56) References Cited

U.S. PATENT DOCUMENTS 6,662,231 B1    12/2003  Drosset et al.
2013/0030935 A1 *  1/2013  Tooks ............... G06Q 30/02
                                                    705/26.1

(Continued)

FOREIGN PATENT DOCUMENTS

CN    114202436 A  *  3/2022  ........... G06F 3/0481
GB      2600132 A  *  4/2022  ........... G06Q 30/06
KR   20210121148 A  *  10/2021

OTHER PUBLICATIONS

"A Meta Study of User-Centric Distribution for Music Streaming," by Rasmus Rex Peterson. pp. 1-22. Published: 2020. (Year: 2020).*

(Continued)

*Primary Examiner* — Sara C Hamilton
(74) *Attorney, Agent, or Firm* — Lee & Hayes, P.C.

(57) ABSTRACT

Methods and systems to facilitate communication and payment to an artist associated with a streaming service platform based on user-centric royalty models are disclosed herein. In one example, a method include receiving a selection of media content to output to a user device associated with a user account and providing the media content to the user device to be presented. The method further determines characteristics of the output of the media content related to how the media content was output by the user device and determine an intent value associated with the media content based on the characteristics. The method further updates the attribution schedule indicating at least a change of a degree of attribution for one or more entities based on the intent value and facilitates a transfer of funds from the user account to an account associated with the one or more entities based on the attribution schedule.

20 Claims, 15 Drawing Sheets

(58) Field of Classification Search
USPC .......................................................... 705/40
See application file for complete search history.

(56) References Cited

U.S. PATENT DOCUMENTS

| | | | |
|---|---|---|---|
| 2013/0054402 A1* | 2/2013 | Asherman | G06Q 30/06 705/26.2 |
| 2014/0324981 A1 | 10/2014 | Cropper et al. | |
| 2016/0117626 A1* | 4/2016 | Baken | G06Q 10/06398 705/7.42 |
| 2016/0366459 A1* | 12/2016 | Kochman | H04N 21/4825 |
| 2018/0225081 A1 | 8/2018 | Dange | |
| 2020/0322685 A1* | 10/2020 | Kiyooka | H04N 21/266 |
| 2020/0351560 A1* | 11/2020 | Kiyooka | H04N 21/4784 |
| 2021/0029180 A1* | 1/2021 | Kulchinsky | H04L 65/4015 |
| 2021/0158317 A1* | 5/2021 | Kurylko | G06Q 20/34 |
| 2021/0271738 A1* | 9/2021 | Hatcher | G06F 21/16 |
| 2021/0272222 A1* | 9/2021 | Hatcher | G06Q 50/184 |
| 2021/0350421 A1* | 11/2021 | Sullivan | G06Q 30/0242 |

OTHER PUBLICATIONS

"Pro Rata and User Centric Distribution Models: A Comparative Study," by Jari Muikku. Digital Media 2: 14. Published Nov. 11, 2017. (Year: 2017).*
Remixing the Music Modernization Act with Fan-Powered Royalties & Harmonizing the Industry for All,: by Madeleine Fosberg. Loy. J. pub. Int. L. 23: 75. Published: 2021. (Year: 2021).*
International Search Report and Written Opinion for International Application No. PCT/US2022/046557, dated Jan. 19, 2023.

* cited by examiner

METHODS AND SYSTEMS FOR INTENT-BASED ATTRIBUTION SCHEDULE

RELATED MATTERS

This application is claims priority to U.S. Provisional Patent Application No. 63/256,478, filed Oct. 15, 2021, titled "METHODS AND SYSTEMS FOR ARTIST COMMUNICATION SESSIONS AND PAYOUT," the entirety of which is incorporated herein by reference.

TECHNICAL FIELD

The popularity of media (e.g., music) streaming services has experienced a tremendous amount of growth in recent years. Media streaming service platforms may utilize various models to pay artists.

BRIEF DESCRIPTION OF THE DRAWINGS

Features of the present disclosure, its nature and various advantages, will be more apparent upon consideration of the following detailed description, taken in conjunction with the accompanying drawings. In the figures, the leftmost digit(s) of a reference number identifies the figure in which the reference number first appears. The use of the same reference numbers in different figures indicates similar or identical items or features. The drawings are not to scale.

DETAILED DESCRIPTION

Figure 1:
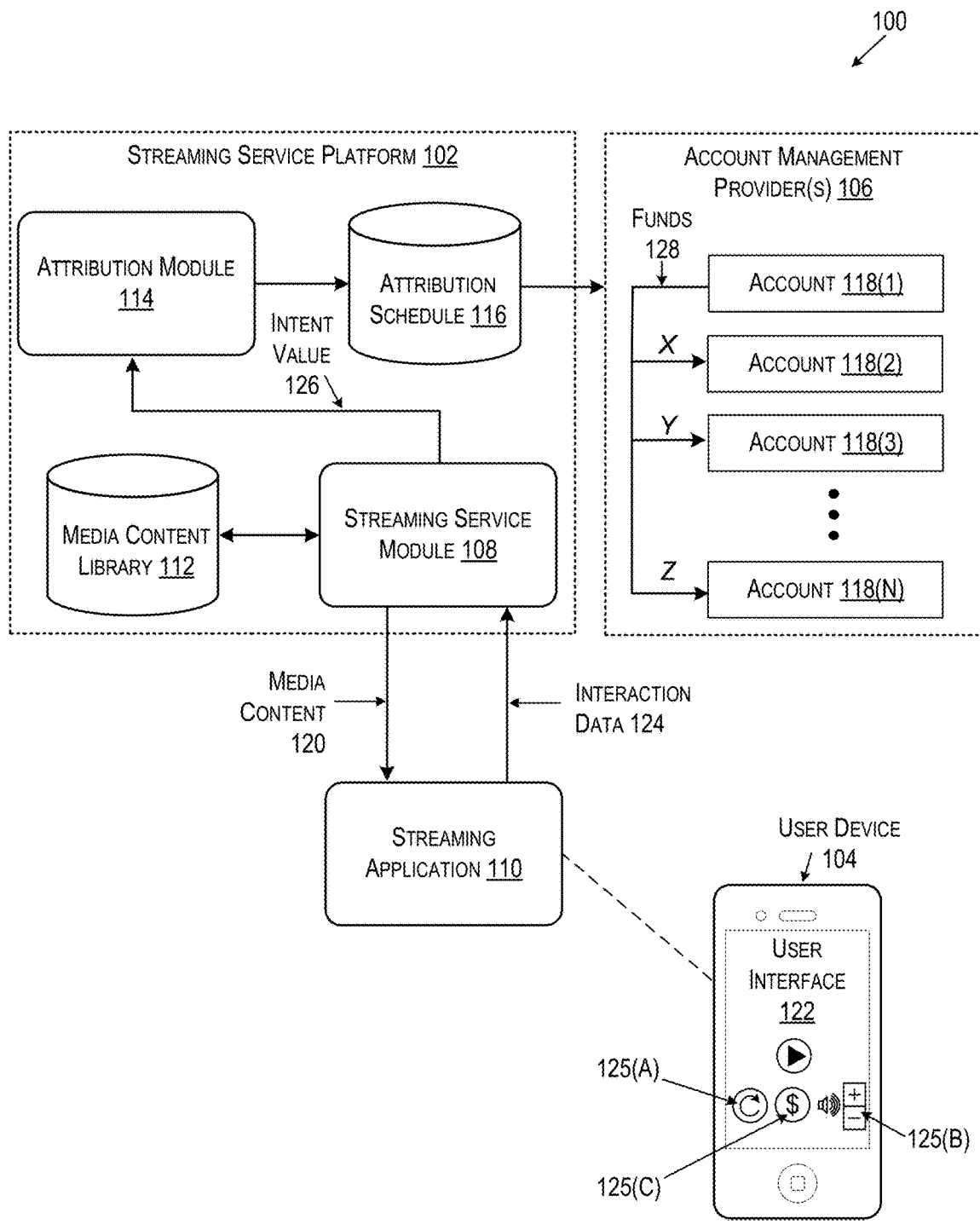
FIG. 1 is a schematic diagram of an example environment that may be implemented for generating an attribution schedule based on determined intent for media content as described herein.

The present disclosure is directed to systems and methods that may be implemented to optimize allocation of royalties to artists. More particularly, using the methods and systems described herein, the streaming service platform can calculate user-centric royalty amounts that take into account an intent for the user with respect to individual media content and make payments to ("pay out") the artists associated with those media content.

In conventional systems, streaming services pay a share of royalties to labels, which then distribute those royalties to the artists under that label per their respective agreements. The disclosure allows a streaming service platform to establish a communication session between users (e.g., subscribers of a streaming platform) and an entity, such as an artist or an artist's representative (such as a publisher), in order to facilitate payment directly to that entity. The streaming service platform can also determine an amount to be paid to the entity based on a user-centric model and user metrics. Specifically, the streaming service platform can collect metadata associated with streaming audio files and can identify royalty and/or additional payments based on the number and/or duration of consumption of audio or video files, which is different from market-share royalty models, thereby reducing the amount of transactions required within the royalty system because the payments are identified and facilitated using just the streaming service platform. The collection of metadata by the streaming service platform simply uses data already being input by the user, which does not significantly add to the use of bandwidth by the streaming service platform. In the case of market-share royalty models, payments are based on market-share and calculated based on the negotiating power of the artist and their label. The payments are then transferred to the labels to be distributed amongst the artists under that label. This results in greater numbers of transactions which increases required bandwidth, and therefore network congestion, in comparison with the present disclosure.

The disclosed innovation determines which media content item (e.g., song, movie, image, etc.), or subset of media content items, are preferred by a user from multiple media content items requested or played by the user. To do this, the system determines an intent associated with each of the media content items played by the user within a period of time. Such an intent may be represented by a numeric data value associated with a determined level of interest of the user in the media content item. The data value may be calculated based on one or more selection methods used by the user to access the media content item and/or based on one or more actions taken by the user during presentation of the media content (e.g., skipping, repeating, etc.). Using user metadata to determine data values instead of requesting further input from the user helps to minimize the use of bandwidth of the streaming service platform because there are no additional or unnecessary interactions of the user with the user device, therefore minimizing interactions between the streaming service platform and the user device.

A user device may be caused to display a user interface provided by a streaming service platform. The user interface may include various representations of various media content items. Just by way of example, the media content items may correspond to songs that the streaming service platform may provide to users that subscribe to or are otherwise associated with the streaming service platform. The user interface may display interactive elements that each correspond to the media content items. For example, a user may search for songs by a certain artist or genre, and the results of that search may be displayed on the user interface. The results may include the songs determined to be associated with the artist, and an interactive element may be displayed in association with each song from the search results.

At this point, a user may select one or more of the interactive elements to cause the user device to output the media content item(s) that were selected. Generally, when user input data is received indicating a selection of a media content item, a request for data representing the media content item is sent to the streaming service platform, which identifies the data and sends an instance of the data representing the selected media content item to the user device that requested the media content item.

Once the media content item has been received, the media content item may be presented (e.g., played) on the user device. The user is able to perform certain functions in relation to the media content item while the media content is being played. For example, the user may skip a media content item, repeat the media content item, increase or decrease a play speed of the media content item, increase or decrease a volume of the media content item, etc. The user is provided with the ability to indicate a preference for one or more media content items. For example, the user may be provided with the ability to assign a ranking or other value to a media content item, add a media content item to a collection or playlist of media content items associated with a user account of the user, select a "like" icon associated with the media content item, and so forth. If a user selects media content items according to preference, the selected media content items are likely to be shown to the user on the user interface before the user is required to input data. This decreases the required bandwidth because further searches for certain media content items are reduced.

In examples, a machine learning model may be generated and configured to determine an intent associated with a particular media content item or entity. In such examples, one or more training datasets may be generated to train the machine learning model to correlate media content items with numeric data values representing a level of interest of the user in the media content items. The training datasets may include any or all of the data described herein, including feedback data indicating whether previously-predicted intent values corresponding to media content items were in fact accurate, thereby improving the accuracy of the intent data values. These training datasets may be associated with a single user profile or may include data from other user profiles that utilize the platform described herein. Thereafter, a trained machine learning model may be generated utilizing the training dataset and the trained machine learning model may be used to calculate an intent for media content played moving forward.

When the intent values for various media content items played by a user have been determined, a royalty basis for each of the media content items may be calculated based on the respective intent values attributed to those media content items. The royalty basis may be calculated for each media content item played by the user over a predetermined period of time (e.g., a billing period, a day, a week, a month, etc.). Royalties can then be distributed to a number of artists using a user-centric model.

Funds in a user-centric model are settled to the artist based on the user streaming behavior/preference, which can result in shifting funds to a smaller artist. More particularly, a percentage of royalties paid by a particular user to an entity (e.g., an artist) associated with a media content item can be calculated by dividing the intent value for the media content item by the total intent basis and multiplying that value by the subscription amount paid by the user for the period of time. In this way, an intent value can be used to distribute funds in a user-centric royalty model by identifying the artists and media content most-likely responsible for retention of a user and distributing that user's subscription fees to artists based on each user's determined contribution to that retention. An entity may be any party associated with (having rights to receive royalties in) a piece of media content. For example, an entity may include an artist, an agent of the artist, a publisher, a label, etc. These processes may be automatic or automated, thereby improving the efficiency of the streaming service platform and the way in which the user's subscription amount is allocated over each period of time.

The disclosure may provide for a number of advantages over conventional systems. For example, under conventional royalty-attribution systems, the majority of royalty funds are transferred to labels and then distributed to artists with the greatest negotiating power, which are often the artists that are the most popular (e.g., artists having the highest amount of content consumed) at the time. However, distributing royalties in this manner increases the amount of transactions required for the royalties to reach the artists. The conventional systems can also result in less popular artists being dissuaded from providing their media content to a streaming platform. This can result in reducing the diversity of the media content provided by the streaming service platform, making discovering new or less popular artists difficult for users. If the user has more difficulty in discovering new or less popular artists, they require more bandwidth in finding the artists by conducting more searches and skipping and/or streaming more media content. A technical effect can therefore be to reduce the bandwidth required by a user due to decreased skipping or changing of media content to find new or less popular artists using the streaming service platform.

In the disclosed user-centric attribution system, royalty funds are distributed directly to artists based on their individual contributions toward maintaining subscribership for the streaming service requiring fewer transactions to transfer any royalties to the artists Further, the determination and distribution of royalty funds is dynamic and results in a streamlined system with improved efficiency.

The techniques described herein include the ability to parse large amounts of media content-related data across thousands of user accounts to determine attribution schedules that are dynamic and user-specific. An attribution schedule may be any suitable indication of a portion or amount to be paid to each of a number of users. In some cases, the attribution schedule may store an indication of a percentage or dollar amount to be paid in royalties to each of a number of artists. More typically, royalty models determine an amount of a given sum of money to provide to a content generator based on consumption of content from that content generator. However, in a computer-centric environment where consumption of content takes many forms and changes second by second and user by user, such a typical royalty model does not accurately determine how funds should be attributed to a content generator. The present innovations solve these problems by generating detailed and time-sensitive data indicating not just that a user interacted with given content but characteristics of that interaction. This detailed data generation and then parsing to determine how to attribute funds across multiple content generators allows for more accurate fund attribution, a system with greater efficiency and fewer transactions, and provides a mechanism for on-the-fly fine tuning of attribution modeling.

Additionally, the generation and training of machine learning models to, among other things, determine media content interaction characteristics are described. The use of specifically trained machine learning models grounds the techniques described herein in a computer-centric environment and produces results that offer improvements over conventional technologies. These improvements include, for example, time sensitive generation of interaction data to determine characteristics of such interactions and how such interactions change attribution schedules for content generators. The models may be trained again and again over time, each time learning new parameters or updating parameter weighting to make the results of those models more accurate, timelier, etc.

In addition, the present innovations describe a process for creating new data pipelines for associating content generators with content consumers. Specifically, a content distribution platform that may be typically focused on distributing media content may, as described herein, integrate royalty payment functionality that more accurately assigns distribution amounts to artists based on the generated attribution schedules. This functionality encourages positive interaction between an artist and a fanbase, which in turn lowers service cancellations.

FIG. 1 is a schematic diagram of an example environment that may be implemented for generating an attribution schedule based on determined intent for media content as described herein. In the environment 100, a streaming service platform 102 is in communication with one or more user devices 104 as well as one or more account management providers 106.

The streaming service platform 102 may include one or more host computing devices that may be used to implement the functionality described herein according to some implementations. The streaming service platform 102 may be hosted on one or more servers or other types of computing devices that may be embodied in any number of ways. For instance, in the case of a server, the streaming service platform 102 may be implemented on a single server, a cluster of servers, a server farm or data center, a cloud hosted computing service, and so forth, although other computer architectures (e.g., a mainframe architecture) may also be used. Further, to the extent that the figures illustrate the components of the streaming service platform 102 as being present in a single location, it is to be appreciated that these components may be distributed across different computing devices and locations in any manner. Generally, the streaming service platform 102 may be implemented by one or more computing devices, with the various functionality described herein distributed in various ways across the different computing devices. The computing devices may be located together or separately, and organized, for example, as virtual servers, server banks and/or server farms. The described functionality may be provided by the servers of a single entity or enterprise or may be provided by the servers and/or services of multiple entities or enterprises.

The streaming service platform 102 may implement a number of software components capable of carrying out various functions. For example, the streaming service platform 102 may implement at least a streaming service module 108 for providing requested media content items to a streaming application 110 executed on a user device 104. The streaming service module 108 may have access to one or more media content library 112 that stores (and provides access to) media content items to be provided by the streaming service module 108 to a streaming application 110. Additionally, the streaming service module 108 may be further in communication with an attribution module 114 configured to determine to generate an attribution schedule 116 based on an intent determined from characteristics/interactions associated with various media content items.

The user device 104 may include any suitable device capable of presenting media content to a user. For example, such suitable devices may include a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. The user device 104 may be configured to present output to a user via one or more output devices (e.g., a display, speakers, etc.) as well as to receive input from a user via one or more input devices (e.g., microphone, touch-screen, buttons, etc.).

The account management provider 106 may include one or more host computing devices that may be used to manage one or more accounts as described herein. The account management provider(s) 106 may be operated by a bank or other financial institution that is separate from the streaming service platform 102. The account management provider 106 may maintain a number of accounts (e.g., bank accounts) 118(1-N), each of which may be associated with a person or other entity. In some cases, at least one origination account (e.g., account 118(1)) may be maintained on behalf of a fund provider, such as a user or the streaming service platform 102. At least a portion of the accounts 118 (e.g., account 118(2-N)) may be associated with particular artists or agents of particular artists (e.g., agents, publishers, labels, etc.).

In the environment, the user device, or rather a streaming application 110 installed upon the user device 104, may request one or more media content items from the streaming service platform 102. Upon receiving a request for media content, the streaming service module 108 may retrieve the appropriate media content item 120 from a media content library 112 and may provide that media content item 120 to the streaming application 110, which may then cause the user device 104 to present the media content item 120 to the user via a user interface (UI) 122. The user interface 122 implemented on the user device 104 may be associated with, and instantiated upon execution of, the streaming application 110.

The streaming application 110 may collect data about various interactions performed by the user in relation to the requested media content item 120. Such interaction data 124 may include any data that can be used to indicate a level of interest of the user in the media content item 120. For example, the streaming application 110 may collect information on how the media content item was requested (e.g., was a search performed specifically for the media content item, did the user click on a representation of the media content item presented in a list of such items, was the request for the media content item the result of a random playlist selection, etc.) Additionally, the streaming application 110 may collect information about one or more actions performed by the user while the media content item 120 is being presented via a number of interactive elements 125. The interactive elements 125 may represent any button, radio selection tool, drop-down menu, or other suitable mechanism that a user of the user device can use to provide input data. For example, the streaming application 110 may determine that the media content item 120 has been skipped or repeated by the user via selection of an interactive element 125 (A) associated with skipping or repeating playing of media content. In another example, the streaming application may determine that the user has increased the volume of the speakers on the user device while the media content item 120 is being presented via selection of an interactive element 125 (B) associated with volume control.

Additionally, the user interface 122 may include an interactive element 125 (C) that enables a user of the user device to provide a direct payment (e.g., a tip) to the artist associated with the media content that is currently being consumed. Selection of the interactive element 125 (C) may cause the user device to obtain information to be used in initiating such a direct payment. In some cases, the direct payment may be for a set amount (e.g., $1.00, $2.00, etc.). In other cases, the user device may prompt the user to provide an indication of an amount to be associated with the direct payment (e.g., via a text input box displayed on the user interface 122).

The streaming application 110 may further collect information about one or more actions performed by the user device after the media content item 120 has been played. For example, the streaming application 110 may receive a rating, a "like," the media content item may be "favorited," or other suitable indication that the user prefers, or does not prefer, the media content item 120. In another example, if the user performs an internet search using a browser application installed on the user device 104, the streaming application may correlate that search with a media content item 120 based on the search relating to either a title and/or an artist associated with the media content item 120. In some cases, the streaming application 110 may collect such user search data that occurs during the playing of the media content or within some predetermined amount of time afterward. The streaming application 110 may provide the collected interaction data 124 back to the streaming service module 108.

The streaming service module 108 may determine one or more characteristics of the output of the media content item based on the received interaction data 124. For example, the streaming service may classify or otherwise categorize a relationship between the user and the media content item based on the received interaction data. To do this, the streaming service module 108 may provide the characteristic/interaction data to a trained machine learning model, which may determine an intent value 126 based on that data.

An intent value 126 may be any numeric data value that represents a calculated degree of a user's interest in the presentation of a particular piece of media content. The intent value 126 may be calculated based on the interaction data 124 received from the user device. In some cases, an amount or degree of the intent value 126 may be calculated as a function of the interaction data. It should be noted that some indications received in the interaction data 124 may cause the intent value 126 to be increased whereas other indications received in the interaction data 124 may cause the intent value 126 to be decreased. Furthermore, each piece of datum of the interaction data 124 may have a different weight, in that an amount by which each piece of datum causes the intent value 126 to be increased or decreased may vary. For example, an action taken by the user to increase the volume of the media content while it is being played may be given a lower weight (e.g., result in a lesser increase to the intent value) than an action taken by the user to provide a direct payment to the artist.

An exemplary trained machine learning model may be trained by providing input data (e.g., sample interaction data) and corresponding output data (e.g., known intent values associated with the interaction data) and adjusting one or more values until the machine learning model is able to correlate the two. In this manner, the trained machine learning model may generate an intent value 126 that can be used by an attribution module 114 to update/generate an attribution schedule 116 that indicates how funds are to be allocated across a number of artists. The attribution schedule 116 may store an indication of a percentage or dollar amount to be paid in royalties to each of a number of artists at any given time. Note that as time passes and more media content is consumed, the attribution schedule continues to be updated until a time at which a payment is made, after which the amounts in the attribution schedule may be zeroed out.

Royalties are paid out by the streaming service platform 102 at predetermined times (e.g., at the end of a billing cycle, etc.). Upon determining that a time to make a payment has arrived, such payment may be completed using the current attribution schedule 116. To do this, instructions may be generated to transfer funds from an origination account (e.g., account 118(1)) to each of a number of accounts associated with artists or other entities (e.g., accounts 118(2-N)). The amount to be transferred to each of the accounts 118(2-N) may be dictated by the attribution schedule 116. One or more of the accounts 118 may be maintained by different account management providers 106. Once the instructions have been generated, they may be provided to the various account management providers 106 to cause the funds 128 to be transferred between accounts 118 as depicted.

Upon receiving instructions from the streaming service platform 102, an account management provider 106 may initiate a number of separate transfers to transfer an indicated amount of funds from the origination account 118(1) to each of a number of accounts 118 (2-N). The different amounts transferred may total an amount to be paid in distributions. For example, the account management provider 106 may transfer X amount to account 118(2), Y amount to account 118(3), and Z amount to account 118(N). In this example, X+Y+Z=T, where T is the total amount to be paid out in royalties for the period of time (e.g., billing period).

Figure 2:
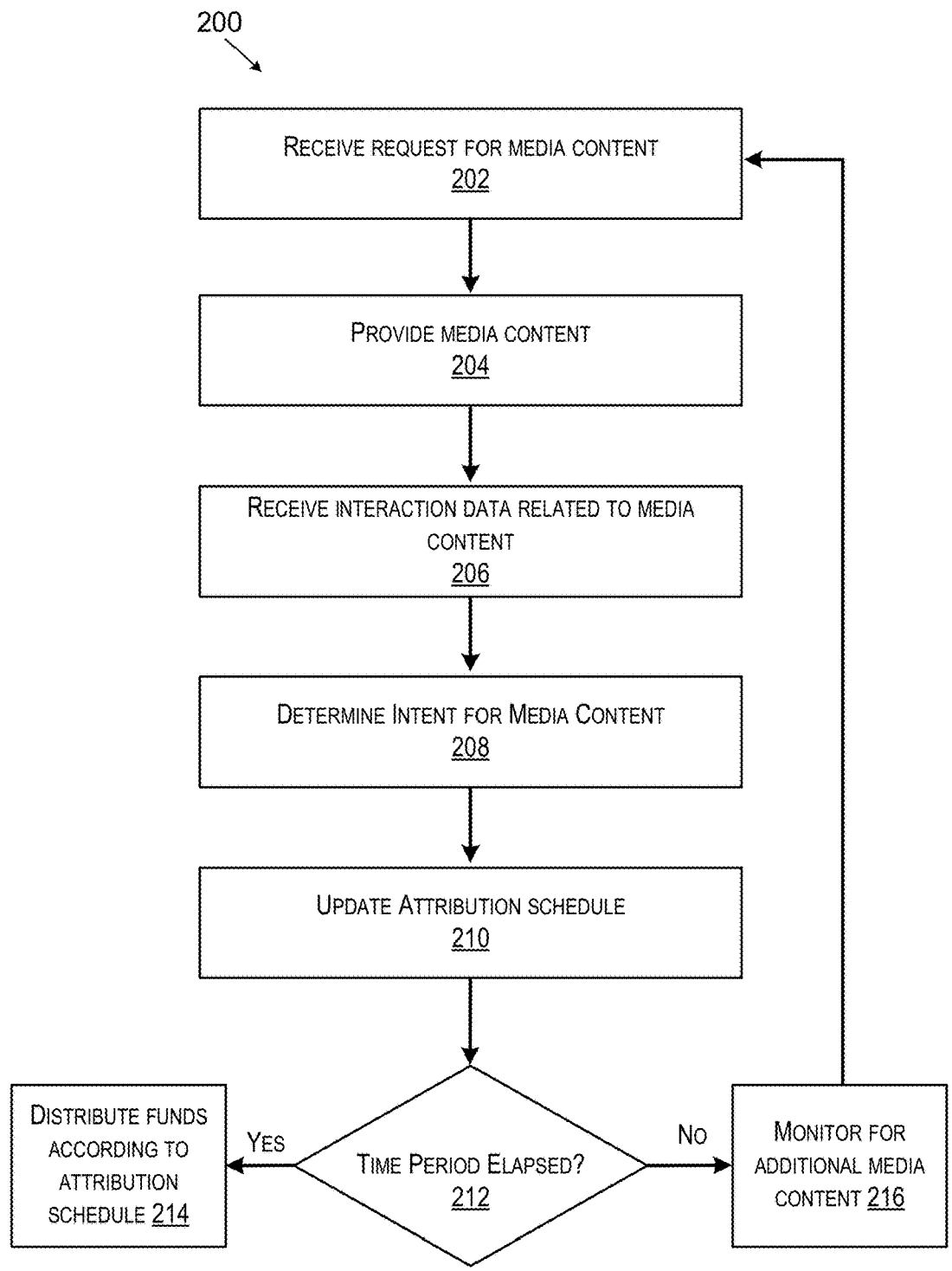
FIG. 2 is a block diagram illustrating a process for generating a distribution of funds based on an intent determined for media content as described herein.

FIG. 2 is a block diagram illustrating a process for generating a distribution of funds based on an intent value determined for media content as described herein. The process 200 may be performed by a streaming service platform, such as the streaming service platform 102 as described in relation to FIG. 1 above.

At 202 of the process 200, the streaming service platform may receive a request for media content 202 from a user device. In some scenarios, the request is a request for a particular media content item. In some scenarios, the request is a request for a media content item associated with a particular artist or genre. In some scenarios, the request is a request for a random media content item to be selected using one or more criteria (e.g., user preferences). Note that in the event that the request is a request for a random media content item, the resulting intent value may be lower than if the request was a request specifically for the media content item or a list of media content that includes the media content item.

At 204 of the process 200, the streaming service platform retrieves the requested media content item from a media content library and provides that media content item to the user device from which the request originated. In some cases, the media content item is provided to a streaming application installed upon, and executed from, the user device. The streaming application may cause the user device to establish a communication session with the streaming service platform, over which the request and the subsequent media content item may be transmitted. The media content item may have associated metadata that includes information about that media content item, such as a title, artist, length, etc.

A media content item may be included within a predetermined grouping. For example, the media content item may be included in an "album" associated with a particular artist or in a "playlist" of media content items selected by a user. In this example, a default playlist intent value may be assigned to each of the media content items by virtue of being included in that playlist. For example, if each media content item consumed by the user based on random selection is assigned a default intent value of 1, then each media content item consumed by the user by virtue of being included in a playlist may be assigned a default intent value of 1.5.

In some cases, the order of the presentation of the media content items (if selected by a user) may be used in assigning individual intent values to each of the media content items in the playlist. For example, the first media content item in the playlist may be assigned a higher intent value than the next media content item in the playlist, such that the intent value assigned to each media content item in the playlist may vary based on the position of the media content item within the playlist. In some embodiments, each of the media content items in the playlist may be assigned the same intent value, regardless of their respective positions within the playlist. However, the calculated intent value for a particular media content item may still be increased or decreased based on other interactions. For example, even though a media content item is assigned the same initial intent value as all of the other media content items in a playlist, that initial intent value may be increased if the user selects to play that media content item at a higher level of volume than the other media content items.

At 206 of the process 200, the streaming service platform may receive interaction data related to the presentation of the media content item by the user device. Such interaction data may include an indication of how the media content was selected by the user in order to generate the request for the media content. Such interaction data may include an indication of one or more actions taken by the user while the media content is being played (e.g., skipped, repeated, etc.). The interaction data may include an indication of the user's preference toward the media content item (e.g., a rating assigned to the media content by the user).

A user may be further provided the ability to initiate a direct payment (e.g., tip) to the entity (e.g., artist) associated with the media content. In some cases, if the user selects an option to provide such a direct payment, then an intent value associated with that media content item may be increased greatly (in addition to initiating the direct payment). In some cases, the amount that the intent value increases may not vary, and the intent value may be increased simply by virtue of being associated with the direct payment. In other cases, the amount that the intent value is increased may vary based on the amount of the direct payment initiated. For example, a higher direct payment may result in a higher increase to an intent value.

At 208 of the process 200, the streaming service platform may determine an intent value to be associated with the user in relation to the media content. As previously noted, an intent value may be a numeric data value that represents a calculated degree of a user's interest in the presentation of a particular piece of media content. The intent value may be calculated based on the interaction data. For example, in some cases a numeric data value may be assigned to each available selection method, such that the manner in which the media content was selected by the user can be assigned that numeric data value. That value may be increased, decreased, and/or remain the same based on information about actions taken by the user while the media content is presented as well as feedback received. In some cases, the numeric data value may be increased each time that the presentation of the media content is repeated. For example, the numeric data value may be incremented (e.g., increased by a set amount) each time that the media content is selected for consumption. In another example, the numeric data value may be increased in accordance with an exponential or logarithmic function. In this example, the amount of the increase to the intent data value decreases each time that the media content is played, so that the intent data value approaches a maximum limit. An intent value may be generated by providing the interaction data to a machine learning model that has been trained to correlate interaction data with numeric data values representing user preference.

An intent value may be determined based on a comparison between one or more actions taken by the user and corresponding actions taken by one or more other users. For example, an intent value may be calculated at least in part based on a relative difference between an average rating assigned to the media content by a user base (e.g., users having an account with the streaming service platform that have assigned a rating to the media content) and a rating assigned to the media content by the user. In another example, the intent value may be calculated based at least partially on a number of times that the user has consumed the media content item in comparison to an average number of times that the media content item is consumed by the user base.

An intent value may be determined based on a comparison between one or more actions taken by the user with respect to the media content item and corresponding actions taken by that same user with respect to other media content items. For example, an intent value may be calculated at least in part based on a relative difference between an average volume that the user typically consumes media at and a volume at which the user has consumed the media content item at issue. In another example, the intent value may be determined at least partially based on the number of times that the user has consumed the media content item in contrast to an average number of times that the user consumes particular media content items.

Calculations of the intent value may be further modified based upon one or more factors related to the length of the presentation of the media content item. For example, a multiplier or other weighting factor may be applied to the intent value determined above based on how long a user has consumed the media content item before stopping, repeating, or skipping, the media content item. In this example, if the user consumes the media content item for less than a threshold amount of time (e.g., 10 seconds, 30 second, half of the total play time for the media content, etc.), no intent value (or an intent value of 0) may be calculated for the media content item. In another example, if the user consumes the media content item for some amount of time that is less than the full amount of time to consume the media content item in its entirety, then the intent value may be multiplied by the percentage of the media content consumed. In another example, if the user consumes the media content item for greater than a threshold amount of time (e.g., 30 seconds, 1 minute, 90% of the total play time for the media content, etc.), an intent value may be calculated for the media content item as if the media content was consumed in its entirety.

At 210 of the process 200, the streaming service platform may update or generate an attribution schedule based on the determined intent value. The attribution schedule may be generated/maintained in relation to a particular user and may include indications of a portion (or dollar amount) of royalties associated with that user (e.g., a portion of the user's subscription fees attributable to royalties) to be paid to each of a number of different artists based on the determined respective intent value for each artist. In this example, an intent basis may be calculated as a sum of the intent values calculated for each of the media content items consumed by (i.e., played by) the user over a period of time (e.g., a billing period). At any given time, a total amount of the royalties associated with the user to be attributed to any particular artist can be calculated as a product of the intent value associated with that artist divided by the intent basis. Each time that the user streams, or otherwise consumes, a media content item during the period of time, an intent value associated with the artist of that media content item may be adjusted (either increased or decreased) based on the determined intent value for that playing of the media content. As a result, throughout a period of time, the attribution schedule may be optimized to reward artists that have most contributed toward the user's continued subscription to the streaming service.

A media content item may be associated with multiple artists. For example, the media content item may represent a collaboration between two or more artists. In another example, a second entity, such as a producer or sponsor, may be entitled to some portion of royalties distributed in relation to the media content item. In these cases, artist information for the media content item (e.g., as determined from metadata associated with that media content item) may include an indication of how royalties related to the media content should be distributed amongst entities. For example, an indication may be associated with a media content item to distribute 60% of royalties for a media content item to Artist A and 40% of royalties for the media content item to Artist B. In these cases, updates to the attribution schedule may be made using the indicated portions, where each artist receives attribution that is a respective portion of what would be received by a single artist. In cases in which multiple artists are listed and no indication of a distribution to each artist is provided, the attribution schedule may update royalty amounts to be made to each of the multiple artists evenly. In some cases, amounts to be distributed to particular artists for a media content may be varied based on actions taken by the user. For example, the amounts allocated to a particular artist may be higher if the user skips ahead to a portion of the song where the particular artist sings, etc.

In some cases, a payout amount associated with an artist in the attribution schedule may be capped. For example, in such cases, a royalty payment to an artist may not exceed a threshold amount (e.g., 10%) of the total subscription fees of the user to be paid out as royalties.

At 212 of the process 200, the streaming service platform may make a determination as to whether a time period associated with the attribution schedule has elapsed. For example, an attribution schedule may be associated with a billing period, such that the attribution schedule starts with each artist having no attribution at the beginning of the billing period. In this example, the attribution associated with each artist is increased over the billing period as media content for that artist is consumed.

If a determination is made that the time period has elapsed (e.g., "Yes" at 212), then the streaming service platform may distribute funds according to the attribution schedule at 214 of process 200. The distribution of funds includes facilitating a transfer of funds to an entity account associated with an entity using third data and based on a period of time lapsing, which may be based on determining an attribution of funds for the entity account associated with the entity using the third data and based on the period of time lapsing. To do this, the streaming service platform may aggregate data (e.g., amounts) from the attribution schedules for each user into an overview attribution schedule. From the overview attribution schedule, the streaming service platform may identify a separate account (e.g., a banking or other account) associated with each of the artists included in the overview attribution schedule to which funds are to be distributed. For each attribution to be made to an artist in the overview attribution schedule, instructions may be generated to transfer an amount of funds for the attribution from an account maintained on behalf of the streaming service platform to the account identified in association with the artist. The generated instructions are then provided to an account management provider that maintains the account on behalf of the streaming service platform. The account maintained on behalf of the streaming service platform may be maintained by a different account management provider than the account identified in association with the artist.

If a determination is made that the time period has not yet elapsed (e.g., "No" at 212), then the streaming service platform may continue to monitor for additional media content at 216. The attribution schedule may continue to be updated as media content is consumed by the user until the period of time has elapsed. During monitoring for media content, the process 200 may return to 204 to await new requests to provide media content to the user.

Figure 3:
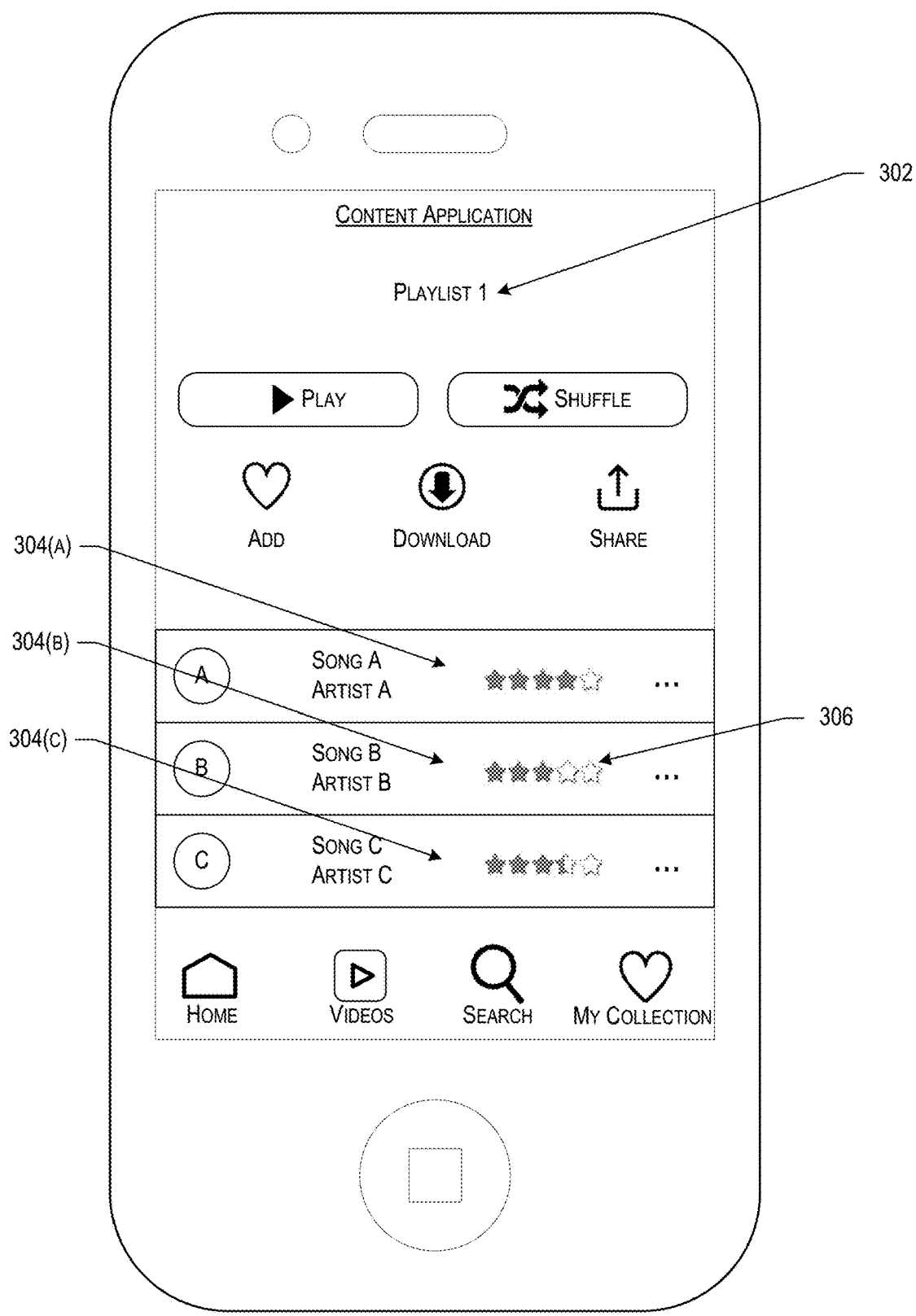
FIG. 3 is a conceptual diagram showing a user interface and system components utilized for presenting media content to a user and collecting interaction data as described herein.

FIG. 3 is a conceptual diagram showing a user interface and system components utilized for presenting media content to a user and collecting interaction data as described herein. The user interfaces may be instantiated on a user device (e.g., user device 104) in relation to a streaming application (e.g., streaming application 110 as described with respect to FIG. 1).

In examples, the user interface may include one or more functionalities that may allow a user of a user device on which the user interface is displayed to provide user input data and to view information associated with media content items. For example, the user interface may include an indicator of subject matter that is currently displayed on the user device. As shown in FIG. 3, a user may have created a playlist 302 of media content items. The playlist 302 may include representations of media content items 304(*a*)-(*c*). While the playlist 302 from FIG. 3 includes three media content items 304(*a*)-(*c*), any playlist may include any number of media content items. Additionally, there may be one or more than one playlist associated with a given user account.

The user interface may also display additional functionality, including a play button that, when selected, may cause the content application to initiate output of audio or video associated with the media content items 304(*a*)-(*c*) from the playlist 302. The user interface may also include a shuffle button configured to cause output of the media content items 304(*a*)-(*c*) in a randomized order. Additional functionality may include an add button to add media content items to the playlist 302, a download button configured to cause a given media content item or the playlist 302 of media content items 304(*a*)-(*c*) to be downloaded to the user device, or a share button configured to allow the user to share the playlist 302 with another user account.

As described in more detail with respect to FIG. 1, a user interface of a streaming application may display certain representations of media content items 304(*a*)-(*c*), and those displayed media content item representations may be utilized as candidate media content items for user selection. In the example of FIG. 3, Song A, Song B, and Song C are currently associated with displayed representations of those media content items 304(*a*)-(*c*). From these options, a user selection may be made.

In addition to the above, the user interface described with reference to FIG. 3 may include a home button configured to cause the user interface to display a home screen associated with the user account at issue. Additionally, a home button may be displayed and may be configured to cause representations of one or more video content items to be displayed for selection by the user. A search button may be presented and may allow the user to search for media content items or be presented with media content items that the streaming service platform has determined to be relevant to the user account at issue. The user interface may also include a "my collection" button that may be utilized to display media content items that the user account has saved, liked, added, downloaded, etc. The user interface may present a button or indication 306 of a rating to be associated with a media content item.

Information may be collected about a user's use of one or more of the interface elements noted above. For example, information may be collected about the user's use of the search function, such as which media content has been searched by the user as well as which media content has been selected from the list of returned search results. In another example, the user's selection of an interface element intended to add a piece of media content to a "favorites" or "collection" may be collected, as well as any rating given to the piece of media content. The information collected by the streaming application via the user interface may be provided to a streaming service platform to be used in updating an attribution schedule as described elsewhere.

FIGS. 4-8 are example processes that may be implemented as described herein. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described is not to be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1 and 9-13, although the processes may be implemented in a wide variety of other environments, architectures and systems.

Figure 4:
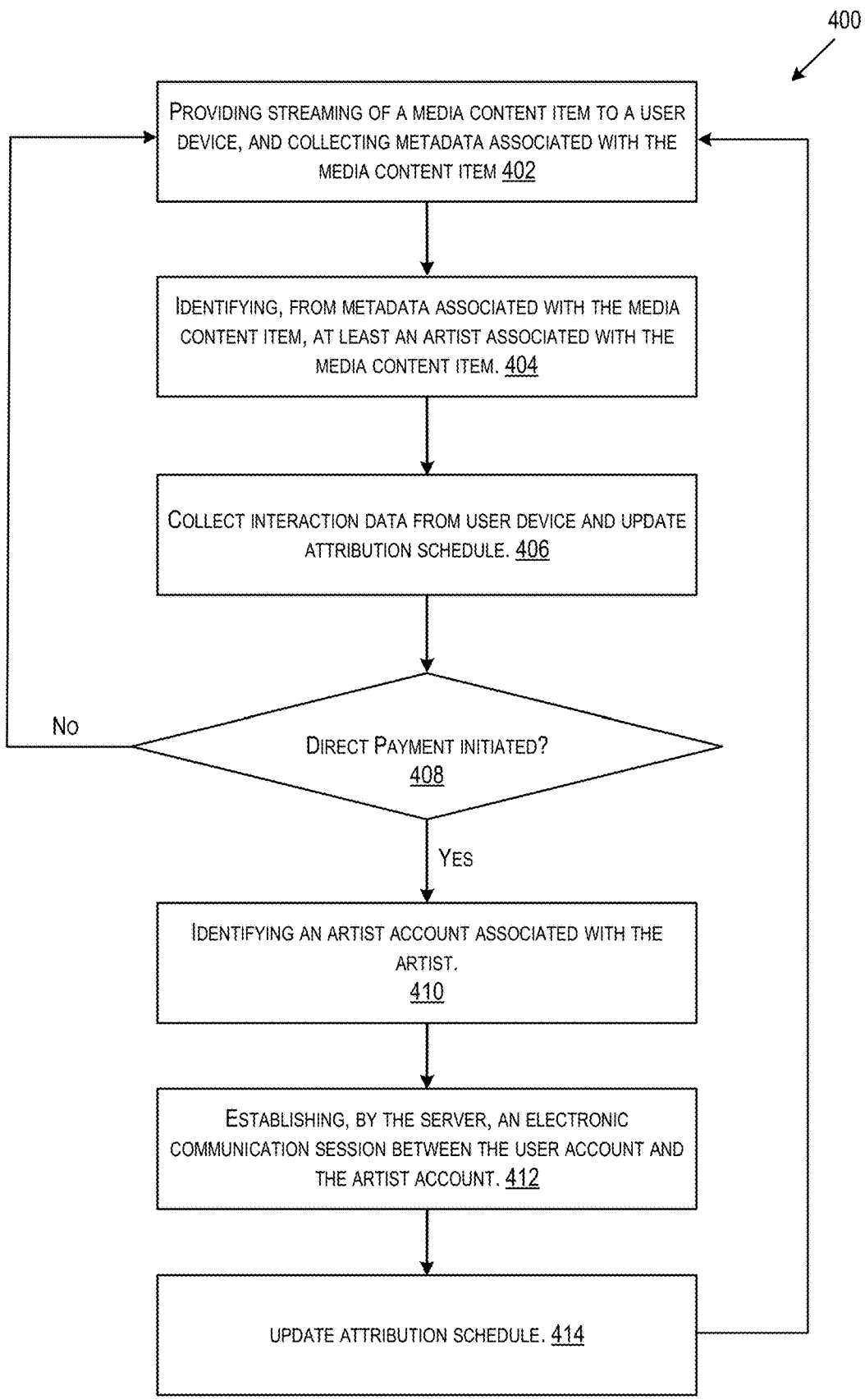
FIG. 4 is a flowchart depicting operational steps for a process performed by a streaming service platform system as described herein.

FIG. 4 is a flowchart depicting operational steps for a process performed by a streaming service platform system as described herein. The order in which the operations or steps are described is not intended to be construed as a limitation, and any number of the described operations may be combined in any order and/or in parallel to implement process 400. The method 400 can be performed by one or more systems or components depicted in FIGS. 9-10, including, for example, a server 1004 and user device 1302, as depicted in FIG. 10. The method 400 describes how a processor or a server of the system can allow a user to transmit payments to an artist or an account associated with an artist or the artist's label. Although the examples herein recite a payment to an artist account, it is intended that the payment could be made to an account of a label for that artist instead. Additionally, in streaming media that includes participants (e.g., interviewer, news reporter, orator) other than artists, a user may transmit payments to one or more of the participants in the media.

Users and artists can each create an account with the streaming service platform where the streaming platform can allow direct payment to the artist's account based on calculated royalty and can direct additional payments from users (e.g., tips by users) to artists. The described streaming service platform also allows the artist to communicate with users and provide additional media elements (e.g., sneak peek into new songs, access to merchandise, or other limited accessibility items), which may be made available upon an additional payment by the user. Other configurations of the method 400 may comprise additional or alternative steps or may omit one or more steps altogether. Some of the steps of the method 400 may be executed by another processor or server (e.g., local processor on an electronic device) under direction and instructions from the system.

The system may display an electronic platform configured to stream electronic media content items (e.g., audio files, such as streaming music from different artists). The system, through the streaming service platform, may further allow users to provide additional payments to artists. For instance, users can tip artists by initiating a payment from the user's account to the artist's account (or an account designated by the label for the artist). As noted below, the system may further provide additional functionality upon initiation of such a direct payment. For example, a direct communication channel may be established between the user and the artist, giving the user increased access to that artist.

In some cases, users and artists may first register and generate an account with the streaming service platform. In these cases, the streaming service platform may include two different portals each with distinct functionality: artist portal and user portal. The artist portal may allow entities affiliated with media content (e.g., artists, labels, agents, etc.) to upload media content items (e.g., audio and/or video files) and receive payments. As used herein, payments refer to royalty payments and/or additional payments (e.g., tips) received from users of the streaming service platform.

At step 402, the system may provide streaming of a media content item to a user device. In some cases, the media content item is provided upon receiving a request for that media content item (e.g., via a direct request for the media content item or via the media content item being included in a playlist). In other cases, the media content item may be provided to the user device as a result of a random, or pseudorandom, selection of media content. For example, each time that the user device finishes streaming of a media content item, a second media content item may be selected to be streamed by that user device. In this example, the second media content item may be selected for streaming by the user device based on its inclusion within a predetermined genre or style.

At 404, the system may identify a number of details about the media content item from metadata associated with that media content item. The metadata may include information about the artist (such as a name, identifier, and/or account identifier), song, album, length of media, sound characteristics, genre, or the like. The system may monitor metadata associated with the audio files being streamed by users (e.g., streamed by a computer that has logged in under a particular user account). Based on the metadata, the system may identify a number of data values associated with the media content. For example, the system may identify a title, at least one artist name or identifier, an album and/or track associated with the media content, a distribution of royalty amounts to each artist associated with the media content, or any other suitable information about the media content being streamed.

At 406, the system may collect interaction data related to the presentation of the media content from the user device to be used to update an attribution schedule. As noted elsewhere, the system may determine an intent value from the interaction data (which may involve the use of a trained machine learning module) and update an amount of royalties to be paid out to the art (or artists) associated with the media content in the attribution schedule.

At 408, a determination may be made as to whether a request has been received to complete a direct payment related to the media content. While step 408 is depicted as occurring during the streaming of a media content on a user device, that is merely exemplary. Note that the system may allow any user to initiate a direct payment at any time. If no request to complete a direct payment is received (e.g., "No" from decision block 408) and the end of the media content item is reached, the system may return to 402 to provide streaming of a subsequent media content item.

Upon receiving a request to complete a direct payment (e.g., "Yes" from decision block 408), the direct payment may be initiated between an account associated with the user and an account associated with the artist. At step 410, one or more artist account associated with the artist is identified using at least the metadata. For example, the artist may be identified using the metadata and an account corresponding to that artist may then be identified based on a mapping of artists to accounts. In case of multiple results, one or more artist associated with a media content item can be identified by mapping artist information against user's streaming behavior (e.g., listening data, interaction data, etc.).

At step 412, an electronic communication session is established between an artist and the user. For example, a dedicated and customized messaging session can be created between the user and the artist to allow certain actions, e.g., to provide an interface for the user to tip the artist, to create custom payment rails for artist to receive payment (separate from the pre-existing rails with labels and performance rights organizations) to generate a secured interface for the artist to release limited edition merchandise, and so on.

At step 414, the attribution schedule associated with the user account may be updated based on information about the conducted direct payment. For example, an amount or portion of the user's subscription fees to be paid out as royalties to the artist may be increased by virtue of the direct payment having been made. In some cases, the amount to be paid out as royalties to the artist may be increased by a set amount upon the direct payment having been made. In other cases, the amount to be paid out as royalties to the artist may be increased by an amount corresponding to an amount of the direct payment made. For example, each $1.00 paid out in a direct payment may result in an increase of the amount to be paid out as royalties to the artist of 1% of the total royalties to be paid out. In some cases, a maximum or cap may be implemented in the attribution schedule, such that no artist receives more than a threshold amount (e.g., 10%) of the total royalties to be paid out from the subscription fees for a user.

In order to be eligible for payments using the systems and techniques as described herein, an artist account may first be created/registered. Artists may register their accounts via at least two different methods, which are described in greater detail with respect to FIG. 5 and FIG. 6 below.

Figure 5:
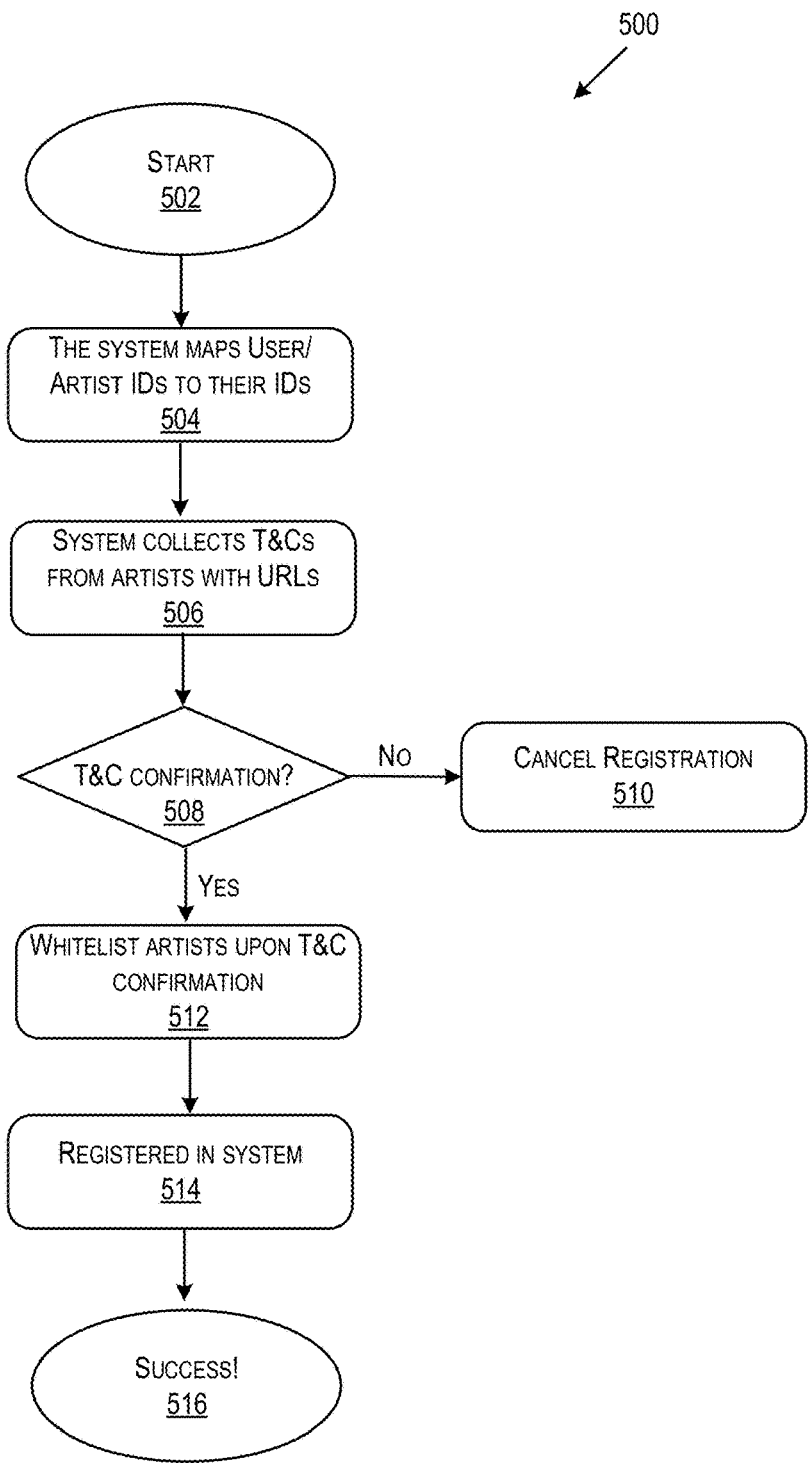
FIG. 5 is a first method of artist registration that may be implemented as described herein.

FIG. 5 is a first method of artist registration that may be implemented as described herein. The method 500 may be initiated at 502, when a request is received to add an artist to the system. In some cases, the request is received from the artist or an agent of the artist. In some cases, the request is initiated for an artist upon a media content associated with that artist being added to a media content library.

At 504, the system creates an account and corresponding identifier to be associated with an artist. This account/identifier may then be linked to each media content item in a media content library associated with that artist. The depicted method 500 is a method in which an artist, or agent of the artist, identifies the artist's account identifier (e.g., for a payment account associated with the artist) and maps the account identifier to the identifier generated for the system.

The system also collects and provides various forms (terms and conditions) using a webpage having a specific uniform resource locator associated with the system (e.g., streaming service platform) at 506. In some cases, the uniform resource locator associated with the webpage may be specific to the artist to be registered.

A determination may be made at 508 as to whether the artist has accepted the terms and conditions (T&C) provided in the webpage. Upon making a determination that the terms and conditions have not been accepted (e.g., "No" from decision block 508), the registration of the artist may be canceled at 510. In some cases, such a cancellation may occur a threshold amount of time (e.g., 30 days, etc.) after the webpage has been provided. In some cases, the artist may be ineligible to receive direct payments if the registration is incomplete or canceled. In some cases, media content items linked to the account created for the artist may be made unavailable for consumption.

Upon receiving an indication that the artist has confirmed the terms and conditions (e.g., "Yes" from decision block 508), the system may "whitelist" the artist by revising an internal data record at 512. As a result, the artist is registered in the system at 514. Because the artist is whitelisted, the method is successful at 516 and the artist can receive payments (e.g., royalty and/or direct payments).

In some cases, an authentication process may be performed once an artist has been registered in order to authenticate that the artist is actually who s/he says s/he is. This may involve intervention by a user/administrator of the system contacting the artist to verify his or her identity. The artist may be provided a code (e.g., a one-time code) via a contact method known to be associated with that artist.

Figure 6:
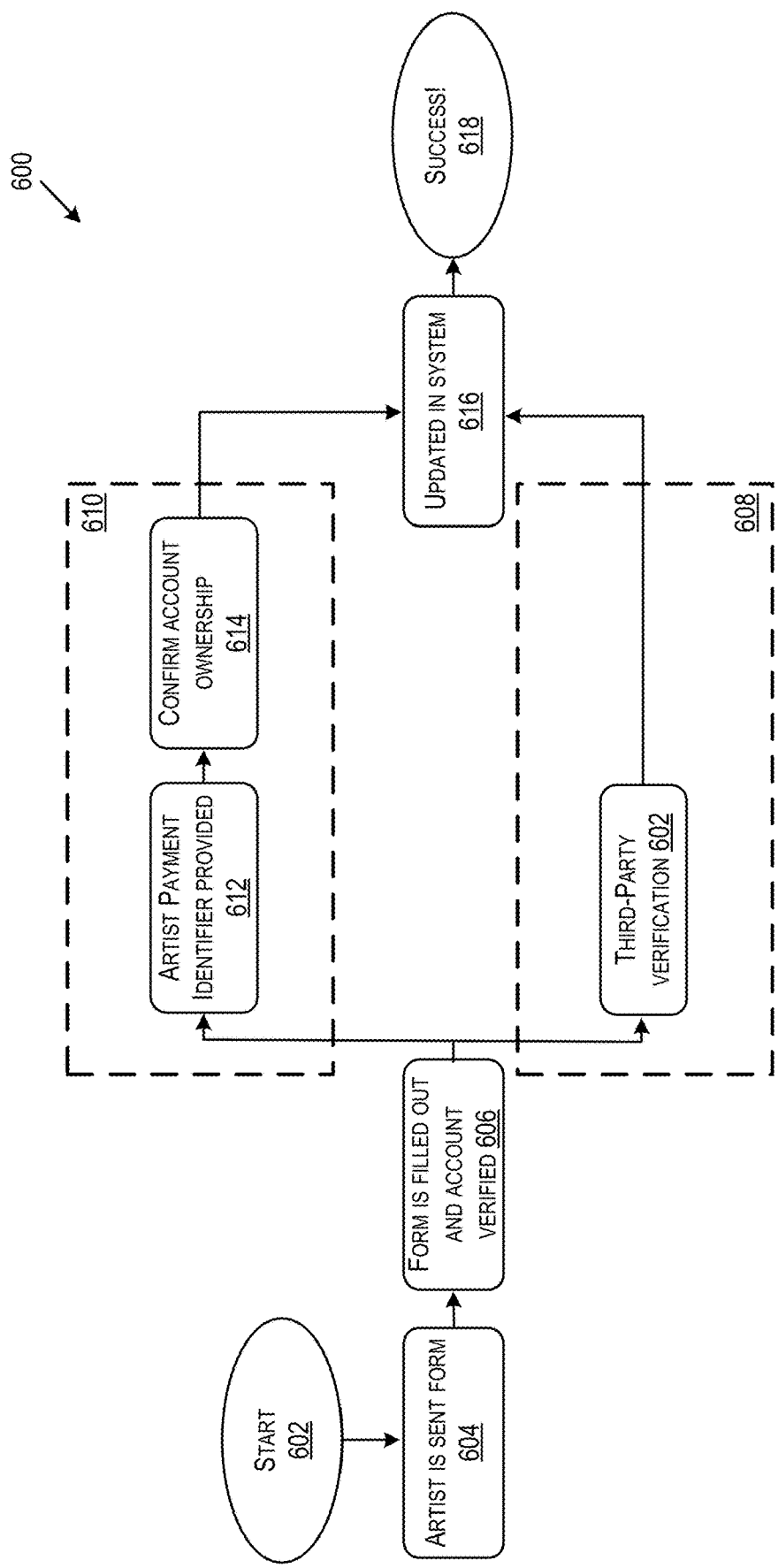
FIG. 6 is a second method of artist registration that may be implemented as described herein.

FIG. 6 is a second method of artist registration that may be implemented as described herein. Similar to the method 500, the method 600 may be initiated at 602, when a request is received to add an artist to the system.

At 604, the artist may be sent a form associated with the account to be created for that artist. In some cases, the form is sent to a contact known to be associated with the artist (e.g., an artist email address, webpage, agent email address, etc.). At 606, the artist may access the form and provide personal information that includes information associated with a financial account.

The system may then verify that the account is an account configured to receive payments from the system. To achieve this, the system may utilize two different methods. If the identified account by the artist is a third-party account (e.g., an account operated by an entity other than the streaming service platform), the system may transmit a request to a third-party server associated with a third-party account requesting the third-party software to verify that the identified account is a valid account and/or associated with the artist at 608.

Alternatively, at 610, the artist may provide a unique identifier associated with their payment account. The unique identifier may be a unique name that is associated with the artist's payment account, such as a login handle or a unique identifier for an account (e.g., $paymentidentifier). The system may confirm the account by retrieving the unique identifier and matching the unique identifier received with a unique identifier of the account at 612. The system may then verify the artist has authority to access an account associated with the identifier (e.g., by verifying a password associated with the identifier).

The system may use various validation and authentication methods to confirm that the artist's payment account belongs to the artist at 614. For example, the system may confirm that a name of an owner of the account matches the name of the artist. Once the system confirms and validates that the account is associated with the artist (and in some cases that the account is a business account), the system may update one or more data records to reflect the confirmation at 616. Once the account is confirmed, the method is successful at 618 and the artist is eligible to be paid by the system.

The system may generate an artist account in such a way where a portion of the subscription fees (paid by the users) will be paid directly to artists (e.g., transmitted to their account). For example, as artists' accounts are registered with the system, the system is able to provide a quick and convenient way to facilitate direct payments. In this example, when a user selects an option to make a direct payment, one or more artists associated with the media content being consumed can be identified (e.g., based on information attached to the media content as metadata). Once the artist has been identified, an account associated with that artist is determined based on a mapping of that artist to the registration data for that artist. A payment can then be initiated between an account associated with the user that requested the direct payment and the account identified in association with the artist.

The system can be structured so that the payments paid to the artists are considered payments from the system to each artist for marketing services. This allows the artists to sign up for payment accounts and process payments with the system (e.g., streaming service platform) as the buyer. As depicted in FIG. 6, the solution has multiple parts.

First, the system may set up an account associated with the system to pay the artists (e.g., generate a unique identifier or a unique account identifier). The account associated with the streaming service platform is used to settle payment transactions conducted between itself and the artist. For example, a payment processor uses the account associated with the system to make a payment to an account associated with the artist. The account associated with the system may also receive and hold funds paid by users to the streaming service platform as subscription fees. For example, a payment processor uses an account associated with the user to make a payment to the account associated with the system.

Second, the system may retrieve information about the artist and generate payment accounts for artists. Using a series of graphical interfaces (also referred to herein as a flow), the system allows the artists to quickly sign up and generate a payment account configured to receive funds from the system.

Third, in some cases, the system may verify that the artist's account to receive a payment is a business account. More particularly, the system may verify that the artist account configured to receive payments on behalf of the artist is a business account and not a private account. In some cases, the system may use a manual verification system in which details of the artist account are reviewed by an administrator or other user. Additionally, or alternatively, the system may query and retrieve data records associated with the artist account to determine whether the account is a business account or a private account. In a non-limiting example, after an artist has registered with the system, the system may retrieve an identifier for each registered account that will be uploaded into the system for processing.

Fourth, the system may create a process for processing the monthly payments. The system may determine how much to pay to each artist as an amount determined by aggregating royalties to be paid to that artist from attribution schedules associated with a number of users. The system may directly make a payment to the artist account. The streaming service platform may also display a dashboard showing details regarding the artist's payments and royalties (e.g., historic payments, payments to be paid out on a specified date, etc.). As described herein, the system may pay the artist for royalties and additional payments, such direct payments (e.g., tips) received from users. Using this dashboard, the artist can see details of their account, such as metrics on their audio files and their share of royalty and tips.

To calculate the royalties, the system may use different royalty models, such as the user-centric royalty model and the market share model. A user-centric royalty system may base the royalty calculation on the individual user. The subscription price of a user is distributed to the artist according to the user's streaming behavior. For instance, if a user only listens to a particular artist in a month, all funds they have paid for their subscription are recorded as a settlement amount for that artist (after the fees associated with the electronic streaming platform have been accounted for). In another example, a user who listens equally to two artists will see their funds distributed evenly between the two artists. This method directs the funds that the user puts into the ecosystem to the artists that the user listens to.

The above-described method contrasts with the market share model, where all streams within a market (e.g., a consumer base or region) and tier (e.g., a volume threshold) are aggregated and funds are distributed based on the overall market share of the artist. The user-centric model may be perceived as fairer, especially to artists having small and medium market shares, and may contribute to creating tighter bonds between artists and fans (users). In addition, using the method 400, many users may have the opportunity to be in communication sessions with their favorite artists and pay them additional payments.

Figure 7:
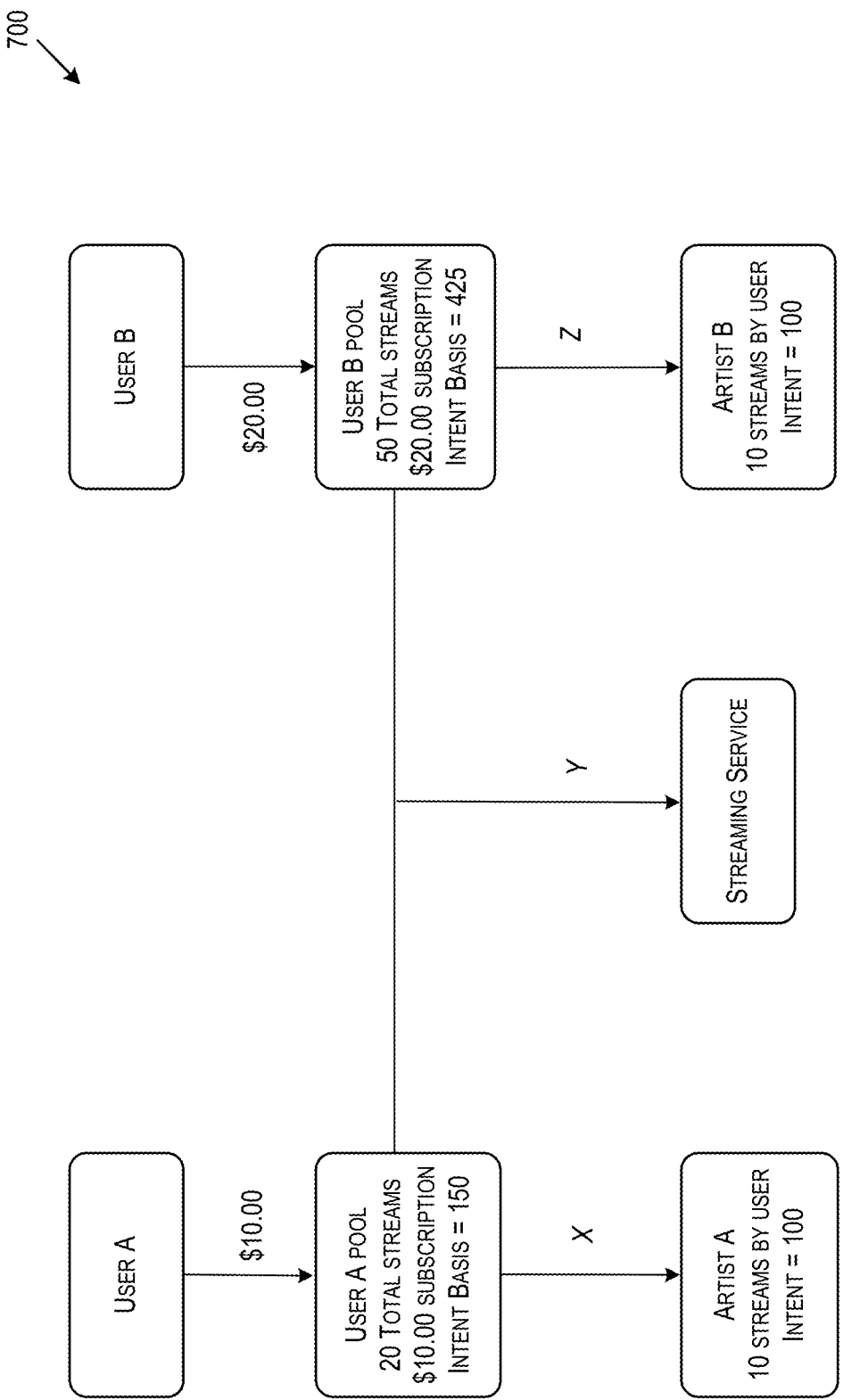
FIG. 7 is a simplified overview of a user-centric royalty model that may be implemented as described herein.

FIG. 7 is a simplified overview of a user-centric royalty model that may be implemented as described herein. In a conventional market share model of royalty distribution/settlement, an aggregated pool of funds is distributed to each label, where it is then distributed by the label to artists under that label based on market share of each individual artist. In contrast to the market share royalty model, funds in a user-centric model are settled to the artist based on the user streaming behavior/preference, which can result in shifting funds to a smaller artist in the depicted example.

In at least some cases, the royalty attributed to a particular artist may be further weighted based on an intent value. For example, a numeric data value may be calculated for each media content item based on an intent value determined for the media content item. As noted elsewhere, this intent value represents a user's interest in that media content item. The intent value may be used as a multiplier in the royalty attribution formula in order to ensure that the royalties paid to an artist appropriately represent a degree to which the artist's contributions have resulted in the user continuing to use the streaming service.

In a version of a user-centric royalty attribution model in which intent value is not used in calculations, the system may use the following algorithm for the royalty calculations as shown in Formula 1 below:

$$\text{Artist Share} = \left(\frac{\text{Streams}}{\text{Total Streams}}\right) * \text{subscription cost} * \left(\frac{\text{royalty share}}{100}\right)$$

In an example implementing Formula 1, the system may use the following values in Formula 1 to calculate a payment for the artist:

$$\text{Artist } A\text{'s Share } (X) = \left(\frac{10}{20}\right) * \$10 * \left(\frac{65}{100}\right) = \$3.25$$

As depicted, the user A will contribute $3.25 in revenue for the Artist A based on listening to the artist's track 10 times out of total of 20 streams in the month, with a subscription cost of $10, and a label share of 65%. This calculation will be done for each track, reported and settled by the system on a periodic basis. In another example, in addition to or instead of stream count, the system may use listened/streamed time to calculate the artist's payments. In some configurations, certain thresholds may apply. For example, stream count qualifies if the media content is consumed more than 2 times (or any other threshold) or the amount of time that the media content is consumed is more than 3 minutes. Note that in this example, only the royalty portion of the subscription cost is distributed as royalties to artists. The remainder of the subscription cost, that which is not attributable to royalties, is provided to the streaming service as fees (e.g., Y).

In a version of a user-centric royalty attribution model in which intent value is used in calculations, the system may use the following algorithm for royalty calculations as shown in Formula 2 below:

$$\text{Artist Share} = \left(\frac{\text{Intent}}{\text{Int. Basis}}\right) * \text{subscirption cost} * \left(\frac{\text{royalty share}}{100}\right)$$

In an example implementing Formula 2, the system may use the following values in Formula 2 to calculate a payment for the Artist A:

$$\text{Artist } A\text{'s Share } (X) = \left(\frac{100}{150}\right) * \$10 * \left(\frac{65}{100}\right) = \$4.33$$

As depicted, under the intent-based scheme, the user A will contribute $4.33 in revenue for the Artist A based on the user's relatively higher degree of interest in the artist, with a subscription cost of $10, and a label share of 65%. Note that the intent value is represented as a numeric data value for a particular piece of media content whereas the intent basis is represented as a sum of all of the intent value s calculated for media content played by the user over a period of time attributed to the subscription cost. From this example, one skilled in the art can see that an intent-based approach is designed to attribute more royalties to an artist based on that artist's contributions toward retaining subscribers of the streaming service.

In a second example implementing Formula 2, the system may use the following values in Formula 2 to calculate a payment for the artist B:

$$\text{Artist } B\text{'s Share } (Z) = \left(\frac{100}{425}\right) * \$20 * \left(\frac{65}{100}\right) = \$3.05$$

As depicted in the second example, the user B will contribute $3.05 in revenue for the Artist B based on the user's determined degree of interest in the artist, with a subscription cost of $20, and a label share of 65%. Note that even though the User B spends twice as much in subscription costs as User A, User B has been determined to have a higher degree of interest in artists other than Artist B. Hence, Artist B receives a lower portion of the subscription fees from User B than Artist A receives from User A.

In addition to paying royalty to artists, the system may also allow direct payment to artists. When a user streams, downloads, or otherwise consumes a media file, the system allows the user to tip the artist. The system may receive a request indicating that the user is interested in tipping or paying additional monetary compensation to the artist. For instance, the user may interact with one or more input elements provided within the streaming service platform to request payment to be sent to the artist.

To pay the artist, the system may first identify an artist intended by the user. The system may collect metadata associated with the media file being streamed by the user where the metadata indicates data associated with the artist, music, producer, media, and the like. The metadata may also indicate usage data associated with the audio file. For instance, the metadata may indicate how many times a user has listened to the audio file. The metadata may also indicate how many minutes (usage duration) the user has listened to the audio file. Additionally, the metadata may indicate how the audio file was initially selected (e.g., the user performed a search specifically for the audio file, etc.) as well as what actions were performed while the audio file was being played (e.g., volume was increased, etc.).

The system may identify an artist account associated with the artist using the metadata retrieved. Using the indication of the artist, the system may determine an account associated with the artist. For instance, the metadata may include a unique identifier of the artist. Also, the metadata may include the name of the song or in the name of the artist. The system may execute a lookup table to identify a payment account associated with the artist.

The system may establish an electronic communication session between the user account and the artist account. This electronic streaming platform may allow the user to directly pay a certain amount to the artist. Specifically, the system may establish an electronic communication session between the user and the artist through their respective accounts. As a result, the user may include a message and a corresponding monetary amount to be transmitted to the artist's account. The user may use various input elements to transmit a message and/or payment to the artist.

In some configurations, using the electronic communication session that is established between the artist and the user, the system may allow the artist to also communicate with the user. For instance, the artist may write back and thank the user for the additional payment. In some configurations, the artist may request additional payments for additional services. For instance, the artist may offer a sneak peek of a new album for an additional payment.

In addition to establishing a communication session between the user and the artist, the system may recommend additional payments when the user has streamed an audio file. For instance, after streaming an audio file, the system may display a message on the streaming platform recommending that the user tips the artist. The recommendation may also include an amount to be paid to the artist. The system may use various rules to determine whether to recommend an additional payment and/or the amount of payment. For instance, the amount of additional payment may be based on the duration of streaming of the audio file and/or a number of times that the user has listened to the audio file. Alternatively, the amount of additional payment may be based on the determined intent for the audio file.

Figure 8:
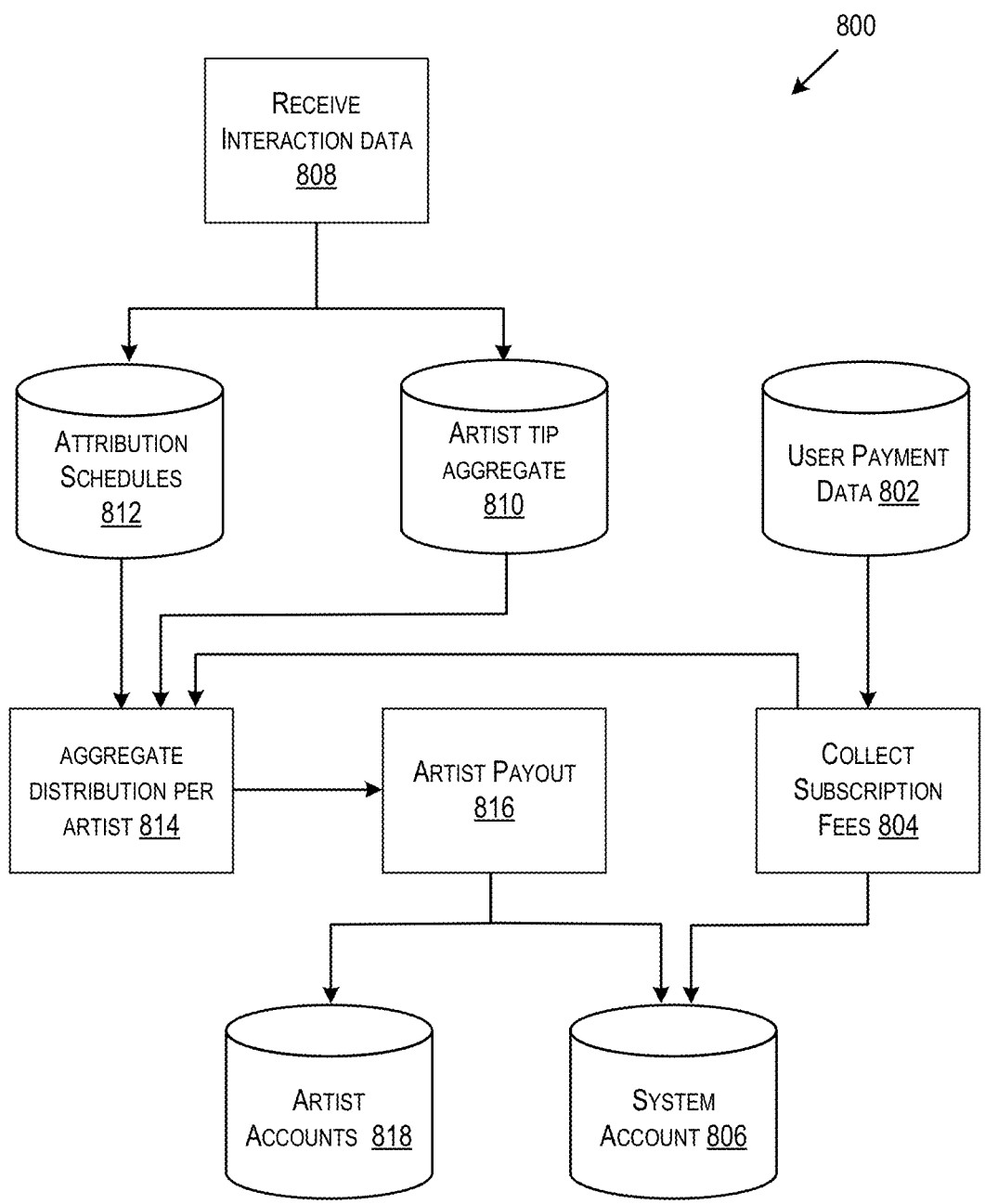
FIG. 8 is a block diagram of a process performed by a system to aggregate payments from different users and provide an aggregated lump sum payment to an artist account as described herein.

FIG. 8 is a block diagram of a process performed by a system to aggregate payments from different users and provide an aggregated lump sum payment to an artist account as described herein. The process 900 may be performed by a streaming service platform, such as the streaming service platform 102 as described with respect to FIG. 1. A streaming service platform may provide streaming media content to a number of user devices associated with a number of users. These users may pay for the media content provided by the streaming service platform. In some cases, users may pay the streaming service platform on a volume basis (e.g., the user pays for a number of media content consumed) or per content basis (e.g., the user pays for each piece of media content consumed). However, in most cases, the user may pay a subscription fee that covers the streaming of media content consumed during a period of time (e.g., a billing period). In these embodiments, a user may provide user payment data 802 that may include financial accounts (e.g., banking accounts) or credit accounts (e.g., credit card accounts) to be used to pay for the subscription fees provided by the streaming service platform.

The streaming service platform may initiate transactions against the user payment data 802 on a periodic basis to collect subscription fees at 804. In some cases, each user may be billed an amount based on a level of service provided to that user. The transactions initiated for the subscription fees are settled to a system account 806 maintained on behalf of the streaming service platform. Provided that a user is current (e.g., the user is up to date on subscription fee payments), the streaming service platform may stream media content items to the user.

As depicted at 808, user interaction data may be received by the streaming service platform from one or more user devices in relation to streamed media content. In some cases, the interaction data may be received while a particular piece of media content is being streamed and may, by virtue of being received while the particular piece of media content is being streamed, be associated with that particular piece of media content. For example, the interaction data may include an indication that the user has, while the media content was played, skipped a media content item, repeated the media content item, increased or decreased a play speed of the media content item, increased or decreased a volume of the media content item, etc.

In other cases, the interaction data may be received separate from the streaming of a piece of media content and may be associated with a particular piece of media content (or artist) by virtue of including an identifier for that piece of media content. For example, the interaction data may include an indication that the user has provided a rating, a "like," for the media content item, or that the media content has been "favorited." In another example, the interaction data may include an indication that the user has selected to provide a direct payment (e.g., a tip) to an artist, or artists, associated with the media content. In this example, an amount associated with the direct payment may be added to an artist tip aggregate 810 maintained with respect to the artist or artists.

As noted elsewhere, the interaction data received at 808 from a user may be used to update an attribution schedule 812 associated with that user. Attribution schedules may include an indication of which artists are to receive a royalty payment in relation to a particular user as well as what portion of that user's subscription fees are to be distributed as royalties to each respective artist. Such attribution schedules may be maintained for each user of the streaming service platform.

At 814, the streaming service platform may determine an aggregate distribution amount to be paid out to one or more artists. In some cases, an attribution schedule for each user may be referenced to determine a portion of the user's fees to be paid out to one or more artists. That portion may be multiplied by the subscription fees collected at 804 (provided that the user is current) to determine an amount to be paid to the artist with respect to that user. This process can be repeated for multiple users to generate an aggregate payment amount for artists included in an attribution schedule. Once the aggregate distribution for each artist has been determined based on the attribution schedules, any artist tip aggregate 810 associated with that artist may be added to generate a total payout for the artist.

At 816, an artist payout step may be performed in which a number of separate transactions may be initiated between the streaming service platform and the artists. Transactions for each artist may be initiated for an amount calculated for the respective artist at 814. The transactions may be based on the system account 806 for payment and may be settled to a respective artist account 818 maintained on behalf of the artist.

With respect to direct payments (e.g., tips), payment for the direct payment may be collected from a user immediately (e.g., the user payment data 802 is used to initiate a transaction for the indicated amount) or an amount of the direct payment may be added to a subscription fee to be collected from the user at the next billing period, to name a few examples. Additionally, while FIG. 8 describes direct payments as being aggregated and added to a payment made to the artist on a periodic basis, in some cases the direct payment may be processed separately and at a time that the request to complete the direct payment is received from the user.

Figure 9:
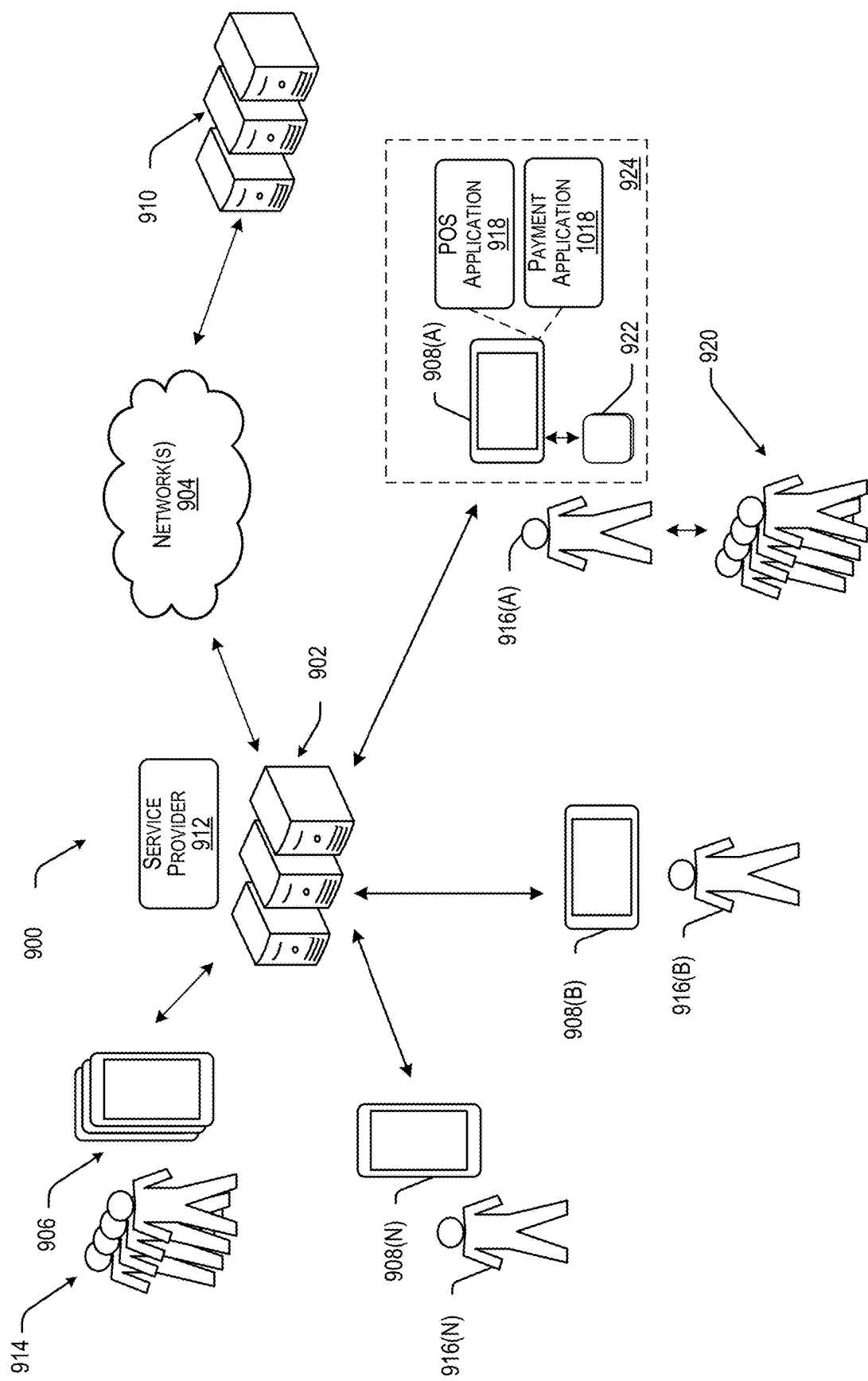
FIG. 9 is an example environment having a number of electronic devices that may be involved in a transaction as described herein.
Figure 10:
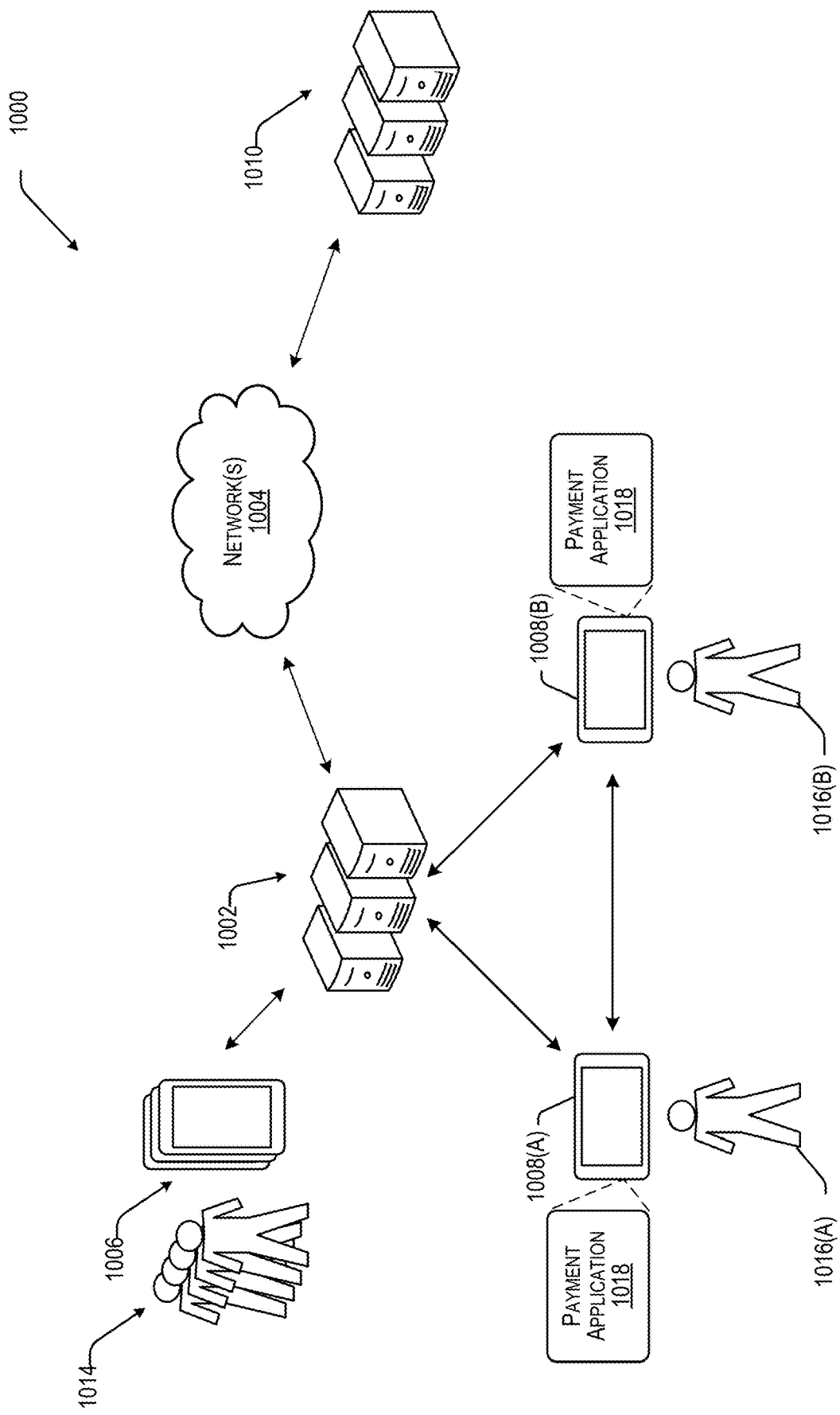
FIG. 10 is an example environment illustrating usage of the payment application, as described herein.

FIG. 9 is an example environment having a number of electronic devices that may be involved in a transaction as described herein. The environment 900 includes server computing device(s) 902 that can communicate over a network 904 with user devices 906 (which, in some examples can be artist devices 908 (individually, 908(A)-908(N))) and/or server computing device(s) 910 associated with third-party service provider(s). The server computing device(s) 902 can be associated with a service provider 912 that can provide one or more services for the benefit of users 914, as described below. Actions attributed to the service provider 912 can be performed by the streaming service platform 102 as described with respect to FIG. 1.

The environment 900 can include a plurality of user devices 906, as described above. Each one of the plurality of user devices 906 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 914. The users 914 can be referred to as customers, buyers, merchants, sellers, borrowers, employees, employers, payors, payees, couriers and so on. The users 914 can interact with the user devices 906 via user interfaces presented via the user devices 906. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 906 can have an instance or versioned instance of a streaming application, which can be downloaded from an application store, for example, which can present the user interface(s) described herein. In at least one example, a user 914 can interact with the user interface via touch input, spoken input, or any other type of input.

As described above, in at least one example, the users 914 can include artists 916 (individually, 916(A)-916(N)). In an example, the artists 916 can operate respective artist devices 908, which can be user devices 906 configured for use by artists 916. For the purpose of this discussion, an "artist" can be any entity that produces audio files that are being streamed using the streaming service platform. The artists 916 can offer items for purchase or other means of acquisition via brick-and-mortar stores, mobile stores (e.g., pop-up shops, food trucks, etc.), online stores, combinations of the foregoing, and so forth. In some examples, at least some of the artists 916 can be associated with a same entity but can have different artist locations and/or can have franchise/franchisee relationships. In additional or alternative examples, the artists 916 can be different artists producing music streamed by the platform. That is, in at least one example, the artist 916(A) is a different artist than the artist 916(B) and/or the artist 916(C).

For the purpose of this discussion, "different artists" can refer to two or more unrelated artists. "Different artists" therefore can refer to two or more artists that are different legal entities (e.g., natural persons and/or corporate persons) that do not share accounting, employees, branding, etc. "Different artists," as used herein, have different names, employer identification numbers (EIN)s, lines of business (in some examples), inventories (or at least portions thereof), and/or the like. Thus, the use of the term "different artists" does not refer to an artist with various artist locations or franchise/franchisee relationships. Such artists—with various artist locations or franchise/franchisee relationships—can be referred to as artists having different artist locations and/or different commerce channels.

Each artist device 908 can have an instance of a POS application 918 stored thereon. The POS application 918 can configure the artist device 908 as a POS terminal, which enables the artist 916(A) to interact with one or more customers 920. As described above, the users 914 can include customers, such as the customers 920 shown as interacting with the artist 916(A). For the purpose of this discussion, a "customer" can be any entity that acquires items from artists. While only two customers 920 are illustrated in FIG. 9, any number of customers 920 can interact with the artists 916. Further, while FIG. 9 illustrates the customers 920 interacting with the artist 916(A), the customers 920 can interact with any of the artists 916. The artist device 908 can further have an instance of a payment application 1018 stored thereon, which is described in greater detail with respect to FIG. 10 below.

In at least one example, interactions between the customers 920 and the artists 916 that involve the exchange of funds (from the customers 920) for items (from the artists 916) can be referred to as "POS transactions" and/or "transactions." In at least one example, the POS application 918 can determine transaction data associated with the POS transactions. Transaction data can include payment information, which can be obtained from a reader device 922 associated with the artist device 908(A), user authentication data, purchase amount information, point-of-purchase information (e.g., item(s) purchased, date of purchase, time of purchase, etc.), etc. The POS application 918 can send transaction data to the server computing device(s) 902. Furthermore, the POS application 918 can present a UI to enable the artist 916(A) to interact with the POS application 918 and/or the service provider 912 via the POS application 918.

In at least one example, the artist device 908(A) can be a special-purpose computing device configured as a POS terminal (via the execution of the POS application 918). In at least one example, the POS terminal may be connected to a reader device 922, which is capable of accepting a variety of payment instruments, such as credit cards, debit cards, gift cards, short-range communication-based payment instruments, and the like, as described below. In at least one example, the reader device 922 can plug in to a port in the artist device 908(A), such as a microphone port, a headphone port, an audio-jack, a data port, or other suitable port. In additional or alternative examples, the reader device 922 can be coupled to the artist device 908(A) via another wired or wireless connection, such as via a Bluetooth®, BLE, and so on. Additional details are described below with reference to FIG. 10. In some examples, the reader device 922 can read information from alternative payment instruments including, but not limited to, wristbands and the like.

In some examples, the reader device 922 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 922, and communicate with the server computing device(s) 902, which can provide, among other services, a payment processing service. The server computing device(s) 902 associated with the service provider 912 can communicate with server computing device(s) 910, as described below. In this manner, the POS terminal and reader device 922 may collectively process transaction(s) between the artists 916 and customers 920.

In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 922 of the POS system 924 are shown as separate devices, in additional or alternative examples, the POS terminal and the reader device 922 can be part of a single device. In some examples, the reader device 9522 can have a display integrated therein for presenting information to the customers 920. In additional or alternative examples, the POS terminal can have a display integrated therein for presenting information to the customers 920. POS systems, such as the POS system 924, may be mobile, such that POS terminals and reader devices may process transactions in disparate locations across the world. POS systems can be used for processing card-present transactions and card-not-present (CNP) transactions, as described below.

A card-present transaction is a transaction where both a customer 920 and his or her payment instrument are physically present at the time of the transaction. Card-present transactions may be processed by swipes, dips, taps, or any other interaction between a physical payment instrument (e.g., a card), or otherwise present payment instrument, and a reader device 922 whereby the reader device 922 is able to obtain payment data from the payment instrument. A swipe is a card-present transaction where a customer 920 slides a card, or other payment instrument, having a magnetic strip through a reader device 922 that captures payment data contained in the magnetic strip. A dip is a card-present transaction where a customer 920 inserts a payment instrument having an embedded microchip (i.e., chip) into a reader device 922 first. The dipped payment instrument remains in the payment reader until the reader device 922 prompts the customer 920 to remove the card, or other payment instrument. While the payment instrument is in the reader device 922, the microchip can create a one-time code which is sent from the POS system 924 to the server computing device(s) 910 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 920 may tap or hover his or her payment instrument (e.g., card, electronic device such as a smart phone running a payment application, etc.) over a reader device 922 to complete a transaction via short-range communication (e.g., NFC, RFID, Bluetooth®, BLE, etc.). Short-range communication enables the payment instrument to exchange information with the reader device 922. A tap may also be called a contactless payment.

A CNP transaction is a transaction where a card, or other payment instrument, is not physically present at the POS such that payment data is required to be manually keyed in (e.g., by an artist, customer, etc.), or payment data is required to be recalled from a card-on-file data store, to complete the transaction.

The POS system 924, the server computing device(s) 902, and/or the server computing device(s) 910 may exchange payment information and transaction data to determine whether transactions are authorized. For example, the POS system 924 may provide encrypted payment data, user authentication data, purchase amount information, point-of-purchase information, etc. (collectively, transaction data) to server computing device(s) 902 over the network(s) 904. The server computing device(s) 902 may send the transaction data to the server computing device(s) 910. As described above, in at least one example, the server computing device(s) 910 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of artists(s). An acquirer can be a registered member of a card association (e.g., Visa®, MasterCard®), and can be part of a card payment network. The acquirer (e.g., the server computing device(s) 910 associated therewith) can send a fund transfer request to a server computing device of a card payment network (e.g., Mastercard®, VISA®, etc.) to determine whether the transaction is authorized or deficient. In at least one example, the service provider 912 can serve as an acquirer and connect directly with the card payment network.

The card payment network (e.g., the server computing device(s) 910 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 910 associated therewith) can make a determination as to whether the customer has the capacity to absorb the relevant charge associated with the payment transaction. In at least one example, the service provider 912 can serve as an issuer and/or can partner with an issuer. The transaction is either approved or rejected by the issuer and/or the card payment network (e.g., the server computing device(s) 910 associated therewith), and a payment authorization message is communicated from the issuer to the POS device via a path opposite of that described above, or via an alternate path.

As described above, the server computing device(s) 910, which can be associated with payment service provider(s), may determine whether the transaction is authorized based on the transaction data, as well as information relating to parties to the transaction (e.g., the customer 920 and/or the artist 916(A)). The server computing device(s) 910 may send an authorization notification over the network(s) 904 to the server computing device(s) 902, which may send the authorization notification to the POS system 924 over the network(s) 904 to indicate whether the transaction is authorized. The server computing device(s) 902 may also transmit additional information such as transaction identifiers to the POS system 924. In one example, the server computing device(s) 902 may include an artist application and/or other functional components for communicating with the POS system 924 and/or the server computing device(s) 910 to authorize or decline transactions.

Based on the authentication notification that is received by the POS system 924 from server computing device(s) 902, the artist 916(A) may indicate to the customer 920 whether the transaction has been approved. In some examples, approval may be indicated at the POS system 924, for example, at a display of the POS system 924. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 912 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 914 can access all of the services of the service provider 912. In other examples, the users 914 can have gradated access to the services, which can be based on risk tolerance, IDV outputs, subscriptions, and so on. In at least one example, access to such services can be availed to the artists 916 via the POS application 918. In additional or alternative examples, each service can be associated with a separate access point (e.g., application, web browser, etc.).

The service provider 912 can offer payment processing services for processing payments on behalf of the artists 916, as described above. For example, the service provider 912 can provision payment processing software, payment processing hardware and/or payment processing services to artists 916, as described above, to enable the artists 916 to receive payments from the customers 920 when conducting POS transactions with the customers 920. For instance, the service provider 912 can enable the artists 916 to receive cash payments, payment card payments, and/or electronic payments from customers 920 for POS transactions and the service provider 912 can process transactions on behalf of the artists 916.

As the service provider 912 processes transactions on behalf of the artists 916, the service provider 912 can maintain accounts or balances for the artists 916 in one or more ledgers. For example, the service provider 912 can analyze transaction data received for a transaction to determine an amount of funds owed to an artist 916(A) for the transaction. In at least one example, such an amount can be a total purchase price less fees charged by the service provider 912 for providing the payment processing services. Based on determining the amount of funds owed to the artist 916(A), the service provider 912 can deposit funds into an account of the artist 916(A). The account can have a stored balance, which can be managed by the service provider 912. The account can be different from a conventional bank account at least because the stored balance is managed by a ledger of the service provider 912 and the associated funds are accessible via various withdrawal channels including, but not limited to, scheduled deposit, same-day deposit, instant deposit, and a linked payment instrument.

A scheduled deposit can occur when the service provider 912 transfers funds associated with a stored balance of the artist 916(A) to a bank account of the artist 916(A) that is held at a bank or other financial institution (e.g., associated with the server computing device(s) 910). Scheduled deposits can occur at a prearranged time after a POS transaction is funded, which can be a business day after the POS transaction occurred, or sooner or later. In some examples, the artist 916(A) can access funds prior to a scheduled deposit. For instance, the artist 916(A) may have access to same-day deposits (e.g., wherein the service provider 912 deposits funds from the stored balance to a linked bank account of the artist on a same day as POS transaction, in some examples prior to the POS transaction being funded) or instant deposits (e.g., wherein the service provider 912 deposits funds from the stored balance to a linked bank account of the artist on demand, such as responsive to a request). Further, in at least one example, the artist 916(A) can have a payment instrument that is linked to the stored balance that enables the artist to access the funds without first transferring the funds from the account managed by the service provider 912 to the bank account of the artist 916(A).

In at least one example, the service provider 912 may provide inventory management services. That is, the service provider 912 may provide inventory tracking and reporting. Inventory management services may enable the artist 916 (A) to access and manage a database storing data associated with a quantity of each item that the artist 916(A) has available (i.e., an inventory). Furthermore, in at least one example, the service provider 912 can provide catalog management services to enable the artist 916(A) to maintain a catalog, which can be a database storing data associated with items that the artist 916(A) has available for acquisition (i.e., catalog management services). In at least one example, the catalog may include a plurality of data items and a data item of the plurality of data items may represent an item that the artist 916(A) has available for acquisition. The service provider 912 can offer recommendations related to pricing of the items, placement of items on the catalog, and multi-party fulfilment of the inventory.

In at least one example, the service provider 912 can provide business banking services, which allow the artist 916(A) to track deposits (from payment processing and/or other sources of funds) into an account of the artist 916(A), payroll payments from the account (e.g., payments to employees of the artist 916(A)), payments to other artists (e.g., business-to-business) directly from the account or from a linked debit card, withdrawals made via scheduled deposit and/or instant deposit, etc. Furthermore, the business banking services can enable the artist 916(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the artists 916 to visualize their cash flow to track their financial health, set aside money for upcoming obligations (e.g., savings), organize money around goals, etc.

In at least one example, the service provider 912 can provide financing services and products, such as via business loans, consumer loans, fixed term loans, flexible term loans, and the like. In at least one example, the service provider 912 can utilize one or more risk signals to determine whether to extend financing offers and/or terms associated with such financing offers.

In at least one example, the service provider 912 can provide financing services for offering and/or lending a loan to a borrower that is to be used for, in some instances, financing the borrower's short-term operational needs (e.g., a capital loan). For instance, a potential borrower that is an artist can obtain a capital loan via a capital loan product in order to finance various operational costs (e.g., rent, payroll, inventory, etc.). In at least one example, the service provider 912 can offer different types of capital loan products. For instance, in at least one example, the service provider 912 can offer a daily repayment loan product, wherein a capital loan is repaid daily, for instance, from a portion of transactions processed by the payment processing service on behalf of the borrower. Additionally, and/or alternatively, the service provider 912 can offer a monthly repayment loan product, wherein a capital loan is repaid monthly, for instance, via a debit from a bank account linked to the payment processing service. The credit risk of the artist may be evaluated using risk models that take into account factors, such as payment volume, credit risk of similarly situated artists, past transaction history, seasonality, credit history, and so on.

Additionally, or alternatively, the service provider 912 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from an artist, which can be one of the artists 916. The service provider 912 can generate the loan based on determining that the borrower purchased or intends to purchase the item from the artist. The loan can be associated with a balance based on an actual purchase price of the item and the borrower can repay the loan over time. In some examples, the borrower can repay the loan via installments, which can be paid via funds managed and/or maintained by the service provider 912 (e.g., from payments owed to the artist from payments processed on behalf of the artist, funds transferred to the artist, etc.). The service provider 912 can offer specific financial products, such as payment instruments, tied specifically to the loan products. For example, in one implementation, the server provider 912 associate's capital to an artist debit card, where the use of the debit card is defined by the terms of the loan. In other examples, the "installment" associated with the loan product is credited directly via the payment instrument. The payment instrument is thus customized to the loan and/or the parties associated with the loan.

The service provider 912 can provide web-development services, which enable users 914 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the artists 916. In at least one example, the service provider 912 can recommend and/or generate content items to supplement omni-channel presences of the artists 916. That is, if an artist of the artists 916 has a web page, the service provider 912 via the web-development or other services—can recommend and/or generate additional content items to be presented via other channel(s), such as social media, email, etc.

Furthermore, the service provider 912 can provide payroll services to enable employers to pay employees for work performed on behalf of employers. In at least one example, the service provider 912 can receive data that includes time worked by an employee (e.g., through imported timecards and/or POS interactions), sales made by the employee, gratuities received by the employee, and so forth. Based on such data, the service provider 912 can make payroll payments to employee(s) on behalf of an employer via the payroll service. For instance, the service provider 912 can facilitate the transfer of a total amount to be paid out for the payroll of an employee from the bank of the employer to the bank of the service provider 912 to be used to make payroll payments. In at least one example, when the funds have been received at the bank of the service provider 912, the service provider 912 can pay the employee, such as by check or direct deposit, often a day, a week, or more after when the work was actually performed by the employee. In additional or alternative examples, the service provider 912 can enable employee(s) to receive payments via same-day or instant deposit based on risk and/or reliability analyses performed by the service provider 912.

Moreover, in at least one example, the service provider 912 can provide employee management services for managing schedules of employees. Further, the service provider 912 can provide appointment services for enabling users 914 to set schedules for scheduling appointments and/or users 914 to schedule appointments.

In some examples, the service provider 912 can provide restaurant management services to enable users 914 to make and/or manage reservations, to monitor front-of-house and/or back-of-house operations, and so on. In such examples, the artist device(s) 908 and/or server computing device(s) 902 can be configured to communicate with one or more other computing devices, which can be located in the front-of-house (e.g., POS device(s)) and/or back-of-house (e.g., kitchen display system(s) (KDS)). In at least one example, the service provider 912 can provide order management services and/or fulfillment services to enable restaurants to manage open tickets, split tickets, and so on and/or manage fulfillment services. In some examples, such services can be associated with restaurant artists, as described above. In additional or alternative examples, such services can be any type of artist.

In at least one example, the service provider 912 can provide fulfilment services, which can use couriers for delivery, wherein couriers can travel between multiple locations to provide delivery services, photography services, etc.

Couriers can be users 914 who can travel between locations to perform services for a requesting user 914 (e.g., deliver items, capture images, etc.). In some examples, the courier can receive compensation from the service provider 912. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 912 can receive requests for courier services, automatically assign the requests to active couriers, and communicate dispatch instructions to couriers via user interface (e.g., application, web browser, or other access point) presented via respective devices 906.

In some examples, the service provider 912 can enable conversational commerce via conversational commerce services, which can use one or more machine learning mechanisms to analyze messages exchanged between two or more users 914, voice inputs into a virtual assistant or the like, to determine intents of user(s) 914. In some examples, the service provider 912 can utilize determined intents to automate customer service, offer promotions, provide recommendations, or otherwise interact with customers in real-time. In at least one example, the service provider 912 can integrate products and services, and payment mechanisms into a communication platform (e.g., messaging, etc.) to enable customers to make purchases, or otherwise transact, without having to call, email, or visit a web page or other channel of an artist. That is, conversational commerce alleviates the need for customers to toggle back and forth between conversations and web pages to gather information and make purchases.

In at least one example, the service provider 912 can provide a peer-to-peer payment service that enables peer-to-peer payments between two or more users 914. In at least one example, the service provider 912 can communicate with instances of a payment application (or other access point) installed on devices 906 configured for operation by users 914. In an example, an instance of the payment application executing on a first device operated by a payor can send a request to the service provider 912 to transfer an amount of funds (e.g., fiat currency or non-fiat currency such as cryptocurrency, securities, and related assets) from an account of the payor to an account of a payee (e.g., a peer-to-peer payment). The service provider 912 can facilitate the transfer and can send a notification to an instance of the payment application executing on a second mobile device operated by the payee that the transfer is in process (or has been completed). In some examples, the service provider 912 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. The service provider 912 may fund the request to payee on behalf of the payor, to speed up the transfer process and compensate for any lags that may be attributed to payor's financial network.

In some implementations, the service provider 912 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee (~), yuan (¥), etc. Although use of the dollar currency indicator ($) is used herein, it is to be understood that any currency symbol could equally be used. The peer-to-peer process can be initiated through a particular application executing on the user devices 906.

The peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by a content provider to enable users of the forum to interact with one another, (e.g., through creating messages, posting comments, etc.). In some cases, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

The peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the service provider 912. For instance, the service provider 912 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 906 (e.g., mobile device or conventional personal computer (PC)) based on instructions transmitted to and from the server computing device(s) 902 (which, in such an example can be called a "messaging server"). In some instances, the messaging application can include a payment application with messaging capability that enables users of the payment application to communicate with one another.

In such instances, the payment application can be executed on the user device 906 based on instructions transmitted to and from the server computing device(s) 902 (e.g., the payment service discussed in this description or another payment service that supports payment transactions).

The peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 912 can generate the landing page to enable the recipient to conveniently receive one or more payments from one or more senders. The personalized location address identifying the landing page is a uniform resource locator (URL) that incorporates the payment proxy. In such embodiments, the landing page is a web page, e.g., www.cash.me/$Cash.

A user 914 may be new to the service provider 912 such that the user 914 that has not registered (e.g., subscribed to receive access to one or more services offered by the service provider) with the service provider 912. The service provider 912 can offer onboarding services for registering a potential user 914 with the service provider 912. In some examples, onboarding can involve presenting various questions, prompts, and the like to a potential user 914 to obtain information that can be used to generate a profile for the potential user 914. In at least one example, the service provider 912 can provide limited or short-term access to one or more services prior to, or during, onboarding (e.g., a user of a peer-to-peer payment service can transfer and/or receive funds prior to being fully onboarded, an artist can process payments prior to being fully onboarded, etc.). In at least one example, responsive to the potential user 914 providing all necessary information, the potential user 914 can be onboarded to the service provider 912. In such an example, any limited or short-term access to services of the service provider 912 can be transitioned to more permissive (e.g., less limited) or longer-term access to such services.

The service provider 912 can be associated with IDV services, which can be used by the service provider 912 for compliance purposes and/or can be offered as a service, for instance to third-party service providers (e.g., associated with the server computing device(s) 910). That is, the service provider 912 can offer IDV services to verify the identity of users 914 seeking to use or using their services. Identity verification requires a customer (or potential customer) to provide information that is used by compliance departments to prove that the information is associated with an identity of a real person or entity. In at least one example, the service provider 912 can perform services for determining whether identifying information provided by a user 914 accurately identifies the customer (or potential customer) (i.e., Is the customer who they say they are?).

The service provider 912 is capable of providing additional or alternative services and the services described above are offered as a sampling of services. In at least one example, the service provider 912 can exchange data with the server computing device(s) 910 associated with third-party service providers. Such third-party service providers can provide information that enables the service provider 912 to provide services, such as those described above. In additional or alternative examples, such third-party service providers can access services of the service provider 912. That is, in some examples, the third-party service providers can be subscribers, or otherwise access, services of the service provider 912.

Techniques described herein can be configured to operate in both real-time/online and offline modes. "Online" modes refer to modes when devices are capable of communicating with the service provider 912 (e.g., the server computing device(s) 902) and/or the server computing device(s) 910 via the network(s) 904. In some examples, the artist device(s) 908 are not capable of connecting with the service provider 912 (e.g., the server computing device(s) 902) and/or the server computing device(s) 910, due to a network connectivity issue, for example. In additional or alternative examples, the server computing device(s) 902 are not capable of communicating with the server computing device(s) 910 due to network connectivity issue, for example. In such examples, devices may operate in "offline" mode where at least some payment data is stored (e.g., on the artist device(s) 908) and/or the server computing device(s) 902 until connectivity is restored and the payment data can be transmitted to the server computing device(s) 902 and/or the server computing device(s) 910 for processing.

In at least one example, the service provider 912 can be associated with a hub, such as an order hub, an inventory hub, a fulfillment hub and so on, which can enable integration with one or more additional service providers (e.g., associated with the additional server computing device(s) 910). In some examples, such additional service providers can offer additional or alternative services and the service provider 912 can provide an interface or other computer-readable instructions to integrate functionality of the service provider 912 into the one or more additional service providers.

Techniques described herein are directed to services provided via a distributed system of user devices 906 that are in communication with one or more server computing devices 902 of the service provider 912. That is, techniques described herein are directed to a specific implementation or a practical application-of utilizing a distributed system of user devices 906 that are in communication with one or more server computing devices 902 of the service provider 912 to perform a variety of services, as described above. The unconventional configuration of the distributed system described herein enables the server computing device(s) 902 that are remotely-located from end-users (e.g., users 914) to intelligently offer services based on aggregated data associated with the end-users, such as the users 914 (e.g., data associated with multiple, different artists and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct artist accounts, e.g., accounts within the control of the service provider 912, and those outside of the control of the service provider 912, to track the business standing (payables, receivables, payroll, invoices, appointments, capital, etc.) of the artists. The techniques herein provide a consolidated view of an artist's cash flow, predict needs, preemptively offer recommendations or services, such as capital, coupons, etc., and/or enable money movement between disparate accounts (artist's, another artist's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 914 and user devices 906. Furthermore, such features are changed dynamically based on the profiles of the users involved interacting with the GUIs. As such, techniques described herein are directed to improvements to computing systems.

FIG. 10 is an example environment illustrating usage of the payment application, as described herein. The environment 1000 includes server(s) 1002 that can communicate over a network 1004 with user devices 1006 (which, in some examples can be user devices 1008 (individually, 1008(A), 1008(B)) and/or server(s) 1010 associated with third-party service provider(s). The server(s) 1002 can be associated with a service provider that can provide one or more services for the benefit of users 1014, as described below. Actions attributed to the service provider can be performed by the server(s) 1002. In some examples, the service provider referenced in FIG. 9 can be the same or different than the service provider referenced in FIG. 10.

As described herein, the server(s) 1002 may be the same or similar to the streaming service platform 102 described with respect to FIG. 1, which may include the same or similar components as described. The user devices 1006, 1008 may be the same or similar to the user device 104 described with respect to FIG. 1. The server(s) 1010 associated with third-party service provider(s) may be the same as or similar to the systems associated with streaming service platform 102 or the like, as described herein.

The environment 1000 can include a plurality of user devices 1006, as described above. Each one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1014. The users 1014 can be referred to as customers, buyers, merchants, sellers, borrowers, employees, employers, payors, payees, couriers and so on. The users 1014 can interact with the user devices 1006 via user interfaces presented via the user devices 1006. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1006 can have an instance or versioned instance of an application, which can be downloaded from an application store, for example, which can present the user interface(s) described herein. In at least one example, a user 1014 can interact with the user interface via touch input, spoken input, or any other type of input.

In at least one example, the service provider can provide a peer-to-peer payment service that enables peer-to-peer payments between two or more users 1014. Two users, user 1016(A) and user 1016(B) are illustrated in FIG. 10 as "peers" in a peer-to-peer payment. In at least one example, the service provider can communicate with instances of a payment application 1018 (or other access point) installed on devices 1006 configured for operation by users 1014. In an example, an instance of the payment application 1018 executing on a first device 1008(A) operated by a payor (e.g., user 1016(A)) can send a request to the service provider to transfer an asset (e.g., fiat currency, non-fiat currency, cryptocurrency, securities, gift cards, and/or related assets) from the payor to a payee (e.g., user 1016(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 11:
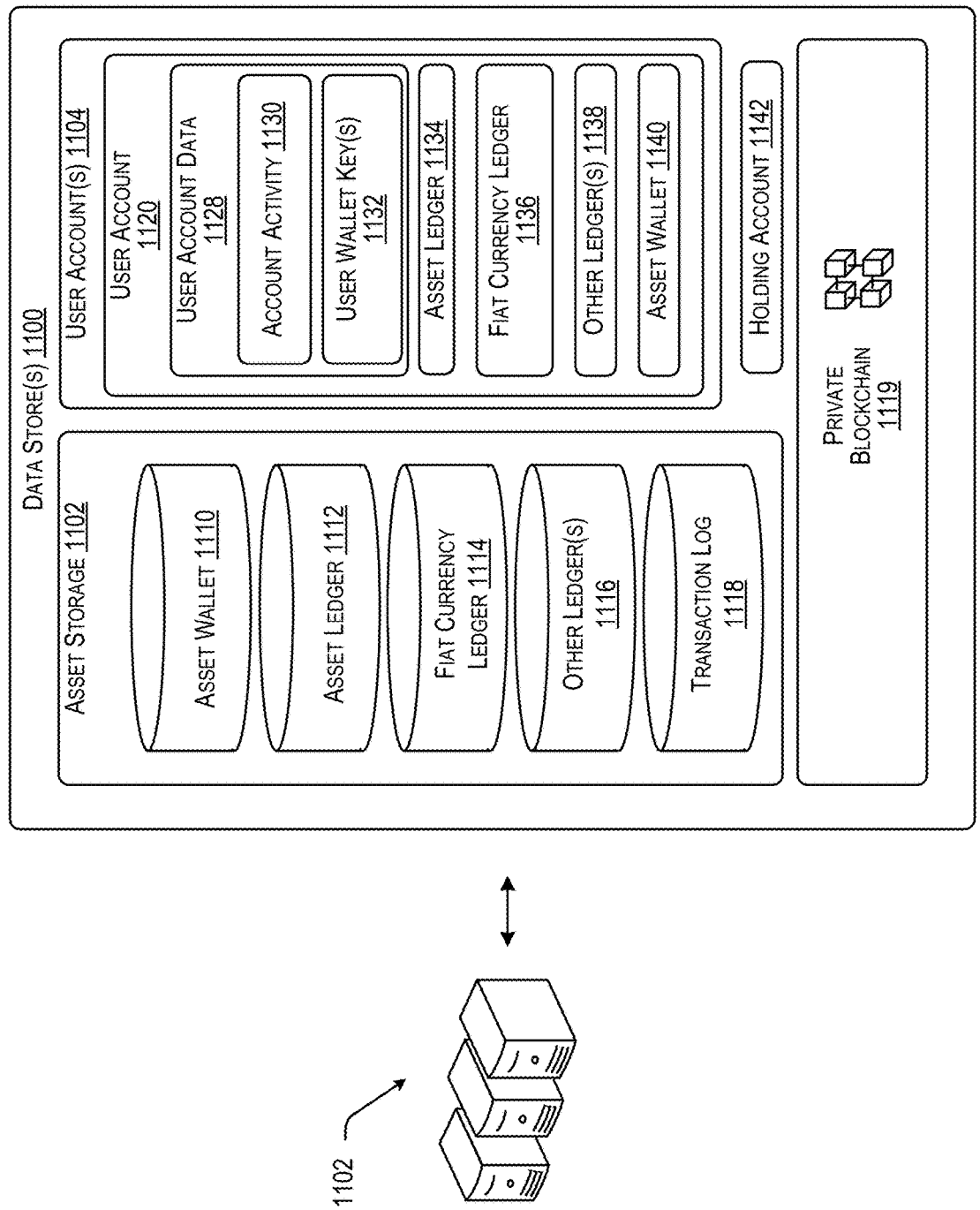
FIG. 11 is an example of data stores that can be associated with servers of the payment service, as described herein.

In some examples, the service provider can utilize a ledger system to track transfers of assets between users 1006. FIG. 11, below, provides additional details associated with such a ledger system. The ledger system can enable users 1006 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1018 executing on user device(s) of payee(s). As an example, the service provider can transfer assets from an account of user 1016(A) to an account of the user 1016(B) and can send a notification to the user device 1008(B) of the user 1016(B) for presentation via a user interface. The notification can indicate that a transfer is in process, a transfer is complete, or the like. In some examples, the service provider can send additional or alternative information to the instances of the payment application 1018 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. The service provider may fund the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1002 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1018 executing on the user devices 1006. The peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a given platform (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

The peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 10. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1006 (e.g., mobile device or conventional personal computer (PC)) based on instructions transmitted to and from the server(s) 1002 (which, in such an example can be called a "messaging server"). In some instances, the messaging application can include a payment application with messaging capability that enables users of the payment application to communicate with one another. In such instances, the payment application can be executed on a user device 1006 based on instructions transmitted to and from the server(s) 1002 (e.g., the payment service discussed in this description or another payment service that supports payment transactions). In some examples, the messaging application can be provided by a third-party service provider associated with the server(s) 1010. In examples where the messaging application is a third-party service provider, the server(s) 1010 can be accessible via one or more APIs or other integrations.

As described above, the service provider can facilitate peer-to-peer transactions, which can enable users 1006 to transfer fiat currency, non-fiat currency, cryptocurrency, securities, or other assets, or portions thereof, to other users 1006. In at least one example, individual users can be associated with user accounts. Additional details associated with user accounts and the transfer of assets between users 1006 are described below with reference to FIG. 11.

Furthermore, the service provider of FIG. 10 can enable users 1006 to perform banking transactions via instances of the payment application 1018. For example, users can configure direct deposits or other deposits for adding assets to their various ledgers/balances. Further, users 1006 can configure bill pay, recurring payments, and/or the like using assets associated with their accounts. In addition to sending and/or receiving assets via peer-to-peer transactions, users 1006 buy and/or sell assets via asset networks such as cryptocurrency networks, securities networks, and/or the like.

FIG. 11 is an example of data store(s) that can be associated with servers of the payment service, as described herein. In at least one example, the data store(s) 1100 can store assets in an asset storage 1102, as well as data in user account(s) 1104, merchant account(s) 1106, and/or customer account(s) 1108. In at least one example, the asset storage 1102 can be used to store assets managed by the service provider of FIG. 10. In at least one example, the asset storage 1102 can be used to record whether individual of the assets are registered to users. For example, the asset storage 1102 can include an asset wallet 1110 for storing records of assets owned by the service provider of FIG. 10, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1010 can be associated therewith. In some examples, the asset wallet 1110 can communication with the asset network via one or more components associated with the server(s) 1002.

The asset wallet 1110 can be associated with one or more addresses and can vary addresses used to acquire assets (e.g., from the asset network(s)) so that its holdings are represented under a variety of addresses on the asset network. In examples where the service provider of FIG. 10 has its own holdings of cryptocurrency (e.g., in the asset wallet 1110), a user can acquire cryptocurrency directly from the service provider of FIG. 10. In some examples, the service provider of FIG. 10 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1102 may contain ledgers that store records of assignments of assets to users 1006. Specifically, the asset storage 1102 may include asset ledger 1110, fiat currency ledger 1114, and other ledger(s) 1116, which can be used to record transfers of assets between users 1006 of the service provider and/or one or more third-parties (e.g., merchant network(s), payment card network(s), ACH network(s), equities network(s), the asset network, securities networks, etc.). In doing so, the asset storage 1102 can maintain a running balance of assets managed by the service provider of FIG. 10. The ledger(s) of the asset storage 1102 can further indicate some of the running balance for each of the ledger(s) stored in the asset storage 1102 is assigned or registered to one or more user account(s) 1104.

In at least one example, the asset storage 1102 can include transaction logs 1118, which can include records of past transactions involving the service provider of FIG. 10. In at least one example, transaction data, as described herein, can be stored in association with the transaction logs 1118.

In some examples, the data store(s) 1100 can store a private blockchain 1119. A private blockchain 1119 can function to record sender addresses, recipient addresses, public keys, values of cryptocurrency transferred, and/or can be used to verify ownership of cryptocurrency tokens to be transferred. In some examples, the service provider of FIG. 10 can record transactions taking place within the service provider of FIG. 10 involving cryptocurrency until the number of transactions has exceeded a determined limit (e.g., number of transactions, storage space allocation, etc.). Based on determining that the limit has been reached, the service provider of FIG. 10 can publish the transactions in the private blockchain 1119 to a public blockchain (e.g., associated with the asset network), where miners can verify the transactions and record the transactions to blocks on the public blockchain. In at least one example, the service provider of FIG. 10 can participate as miner(s) at least for its transactions to be posted to the public blockchain.

In at least one example, the data store(s) 1100 can store and/or manage accounts, such as user account(s) 1104, merchant account(s) 1106, and/or customer account(s) 1108. In at least one example, the user account(s) 1104 may store records of user accounts associated with the users 1006. In at least one example, the user account(s) 1104 can include a user account 1120, which can be associated with a user (of the users 1006). Other user accounts of the user account(s) 1104 can be similarly structured to the user account 1120, according to some examples. In other examples, other user accounts may include more or less data and/or account information than that provided by the user account 1120. In at least one example, the user account 1120 can include user account data 1128, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1128 can include account activity 1130 and user wallet key(s) 1132. The account activity 1130 may include a transaction log for recording transactions associated with the user account 1120. In some examples, the user wallet key(s) 1132 can include a public-private key-pair and a respective address associated with the asset network or other asset networks. In some examples, the user wallet key(s) 1132 may include one or more key pairs, which can be uni3ue to the asset network or other asset networks.

In addition to the user account data 1128, the user account 1120 can include ledger(s) for account(s) managed by the service provider of FIG. 10, for the user. For example, the user account 1120 may include an asset ledger 1134, a fiat currency ledger 1136, and/or one or more other ledgers 1138. The ledger(s) can indicate that a corresponding user utilizes the service provider of FIG. 10 to manage corresponding accounts (e.g., a cryptocurrency account, a securities account, a fiat currency account, etc.). In some examples, the ledger(s) can be logical ledger(s) and the data can be represented in a single database. In some examples, individual of the ledger(s), or portions thereof, can be maintained by the service provider of FIG. 10.

In some examples, the asset ledger 1134 can store a balance for each of one or more cryptocurrencies (e.g., Bitcoin, Ethereum, Litecoin, etc.) registered to the user account 1120. In at least one example, the asset ledger 1134 can further record transactions of cryptocurrency assets associated with the user account 1120. For example, the user account 1120 can receive cryptocurrency from the asset network using the user wallet key(s) 1132. In some examples, the user wallet key(s) 1132 may be generated for the user upon request. User wallet key(s) 1132 can be requested by the user in order to send, exchange, or otherwise control the balance of cryptocurrency held by the service provider of FIG. 10 (e.g., in the asset wallet 1110) and registered to the user. In some examples, the user wallet key(s) 1132 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 10 and the value is credited as a balance in asset ledger 1134), by purchasing currency in the form associated with the account using currency in a different form (e.g., buying a value of cryptocurrency from the service provider of FIG. 10 using a value of fiat currency reflected in fiat currency ledger 1114, and crediting the value of cryptocurrency in asset ledger 1134), or by conducting a transaction with another user (customer or merchant) of the service provider of FIG. 10 wherein the account receives incoming currency (which can be in the form associated with the account or a different form, in which the incoming currency may be converted to the form associated with the account). In some examples, the user account data 1128 can include preferences for maintaining balances of individual of the ledgers. For example, the service provider of FIG. 10 can automatically debit the fiat currency ledger 1136 to increase the asset ledger 1134, or another account associated with the user whenever the cryptocurrency balance (e.g., of the asset ledger 1134) falls below a stated level (e.g., a threshold). Conversely, the service provider of FIG. 10 can automatically credit the fiat currency ledger 1136 to decrease the asset ledger 1134 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s)) unrelated to the service provider of FIG. 10 (i.e., an external account). In at least one example, the user can transfer all or a portion of a balance of the cryptocurrency stored in the third-party cryptocurrency wallet to the service provider of FIG. 10. Such a transaction can require the user to transfer an amount of the cryptocurrency in a message signed by user's private key to an address provided by the service provider of FIG. 10. In at least one example, the transaction can be sent to miners to bundle the transaction into a block of transactions and to verify the authenticity of the transactions in the block. Once a miner has verified the block, the block is written to a public, distributed blockchain where the service provider of FIG. 10 can then verify that the transaction has been confirmed and can credit the user's asset ledger 1134 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 10. As described above, in some examples, the service provider of FIG. 10 can acquire cryptocurrency from a third-party source. In such examples, the asset wallet 1110 can be associated with different addresses and can vary addresses used to acquire cryptocurrency so that its holdings are represented under a variety of addresses on a blockchain. When the service provider of FIG. 10 has their own holdings of cryptocurrency, users can acquire cryptocurrency directly from the service provider of FIG. 10. In some examples, the service provider of FIG. 10 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 10 has its own cryptocurrency assets, cryptocurrency transferred in a transaction (e.g., data with address provided for receipt of transaction and a balance of cryptocurrency transferred in the transaction) can be stored in the asset wallet 1110. In at least one example, the service provider of FIG. 10 can credit the asset ledger 1134 of the user. Additionally, while the service provider of FIG. 10 recognizes that the user retains the value of the transferred cryptocurrency through crediting the asset ledger 1134, any person that inspects the blockchain will see the cryptocurrency as having been transferred to the service provider of FIG. 10. In some examples, the asset wallet 1110 can be associated with many different addresses. In such examples, any person that inspects the blockchain may not easily associate all cryptocurrency stored in asset wallet 1110 as belonging to the same entity. It is this presence of a private ledger that is used for real-time transactions and maintained by the service provider of FIG. 10, combined with updates to the public ledger at other times, that allows for extremely fast transactions using cryptocurrency to be achieved. In some examples, the "private ledger" can refer to the asset ledger 1110, which in some examples, can utilize the private blockchain 1119, as described herein. The "public ledger" can correspond to a public blockchain associated with the asset network.

In at least one example, a user's asset ledger 1134, fiat currency ledger 1136, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1134. In some examples, a user can receive fiat currency or another currency in the form of payment for a transaction with another user. In at least one example, at least a portion of such funds can be converted into cryptocurrency by the service provider of FIG. 10 and used to fund the asset ledger 1134 of the user.

As addressed above, in some examples, users can also have other accounts maintained by the service provider of FIG. 10. For example, a user can also have an account in U.S. dollars, which can be tracked, for example, via the fiat currency ledger 1136. Such an account can be funded by transferring money from a bank account at a third-party bank to an account maintained by the service provider of FIG. 10 as is conventionally known. In some examples, a user can receive fiat currency in the form of payment for a transaction with another user. In such examples, at least a portion of such funds can be used to fund the fiat currency ledger 1136.

In some examples, a user can have one or more internal payment cards registered with the service provider of FIG. 10. Internal payment cards can be linked to one or more of the accounts associated with the user account 1120. Options with respect to internal payment cards can be adjusted and managed using an application (e.g., the payment application 1018).

In at least one example, as described above, each ledger can correspond to an account of the user that is managed by the service provider of FIG. 10. In at least one example, individual of the accounts can be associated with a wallet or a stored balance for use in payment transactions, peer-to-peer transactions, payroll payments, etc.

In at least one example, the user account 1120 can be associated with an asset wallet 1140. The asset wallet 1140 of the user can be associated with account information that can be stored in the user account data 1128 and, in some examples, can be associated with the user wallet key(s) 1132. In at least one example, the asset wallet 1140 can store data indicating an address provided for receipt of a cryptocurrency transaction. In at least one example, the balance of the asset wallet 1140 can be based on a balance of the asset ledger 1134. In at least one example, funds availed via the asset wallet 1140 can be stored in the asset wallet 1140 or the asset wallet 1110. Funds availed via the asset wallet 1110 can be tracked via the asset ledger 1134. The asset wallet 1140, however, can be associated with additional cryptocurrency funds.

In at least one example, when the service provider of FIG. 10 includes a private blockchain 1119 for recording and validating cryptocurrency transactions, the asset wallet 1140 can be used instead of, or in addition to, the asset ledger 1134. For example, at least one example, a merchant can provide the address of the asset wallet 1140 for receiving payments. In an example where a customer is paying in cryptocurrency and the customer has their own cryptocurrency wallet account associated with the service provider of FIG. 10, the customer can send a message signed by its private key including its wallet address (i.e., of the customer) and identifying the cryptocurrency and value to be transferred to the merchant's asset wallet 1140. The service provider of FIG. 10 can complete the transaction by reducing the cryptocurrency balance in the customer's cryptocurrency wallet and increasing the cryptocurrency balance in the merchant's asset wallet 1140. In addition to recording the transaction in the respective cryptocurrency wallets, the transaction can be recorded in the private blockchain 1119 and the transaction can be confirmed. A user can perform a similar transaction with cryptocurrency in a peer-to-peer transaction as described above. In at least one example, the cryptocurrency wallet account 1130 can be funded by a balance transfer from a third-party cryptocurrency wallet, as described above. Such a transaction can re3uire a user to transfer an amount of cryptocurrency in a message signed by the user's private key to an address of the cryptocurrency wallet account 1130. The transferred amount of cryptocurrency can then be within the cryptocurrency wallet account 1130 for use in later transactions.

While the asset ledger 1134 and/or asset wallet 1140 are each described above with reference to cryptocurrency, the asset ledger 1134 and/or asset wallet 1140 can alternatively be used in association with securities. In some examples, different ledgers and/or wallets can be used for different types of assets. That is, in some examples, a user can have multiple asset ledgers and/or asset wallets for tracking cryptocurrency, securities, or the like.

The data stores 1100 may also include a holding account 1142, which may be similar to and perform similar functions as the holding account 146 described with respect to FIG. 1.

User(s) having accounts managed by the service provider of FIG. 10 is an aspect of the technology disclosed that enables technical advantages of increased processing speed and improved security.

Figure 12:
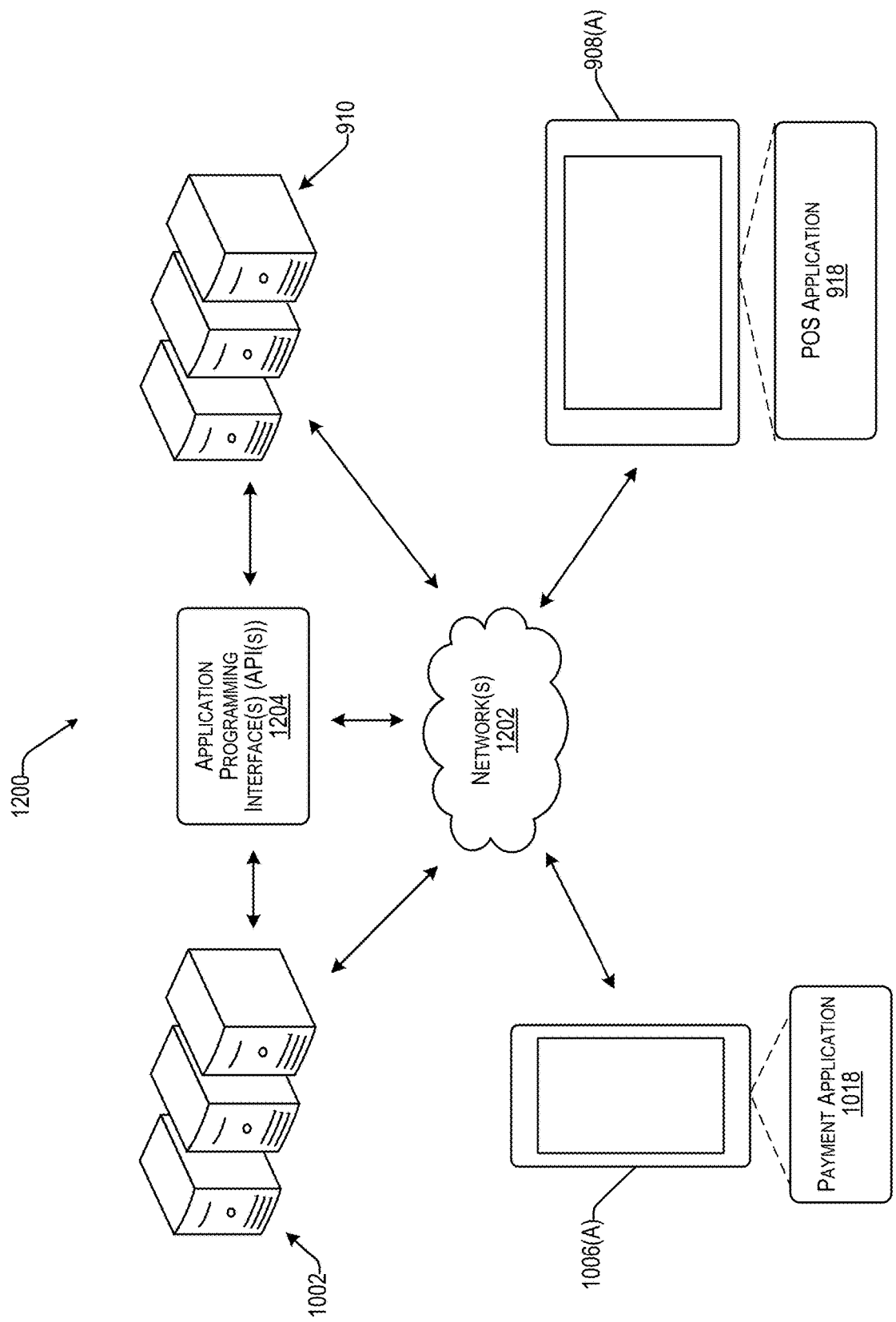
FIG. 12 is an example environment wherein the environment 900 and the environment 1000 can be integrated to enable payments at the point-of-sale using assets associated with user accounts as described herein.

FIG. 12 is an example environment 1200 wherein the environment 900 and the environment 1000 can be integrated to enable payments at the point-of-sale using assets associated with user accounts in the peer-to-peer environment of FIG. 10, as described herein. As illustrated, each of the components can communicate with one another via one or more networks 1202. In some examples, one or more APIs 1204 or other functional components can be used to facilitate such communication. For example, the APIs 1204 can be used to facilitate communication with payment service server(s) 1002 and server(s) 1010 associated with third-party service provider(s).

In at least one example, the example environment 1200 can enable contactless payments, via integration of peer-to-peer payment, or other payment making, platform(s) and payment processing platform(s), are described herein. For the purpose of FIG. 12, the environment 900 can refer to a payment processing platform and the environment 1000 can refer to a peer-to-peer payment, or payment making, platform. In an example, such an integration can enable a customer to participate in a transaction via their own computing device instead of interacting with a merchant device of a merchant, such as the merchant device 908(A). In such an example, the POS application 918, associated with a payment processing platform and executable by the merchant device 908(A) of the merchant, can present a Quick Response (QR) code, or other code that can be used to identify a transaction (e.g., a transaction code), in association with a transaction between the customer and the merchant. The QR code, or other transaction code, can be provided to the POS application 918 via an API associated with the peer-to-peer payment platform. In an example, the customer can utilize their own computing device, such as the user device 1008(A), to capture the QR code, or the other transaction code, and to provide an indication of the captured QR code, or other transaction code, to server(s) 902 and/or server(s) 1002.

Based on the integration of the peer-to-peer payment platform and the payment processing platform (e.g., via the API), the server(s) 902 and/or 1002 associated with each can exchange communications with each other—and with a payment application 1018 associated with the peer-to-peer payment platform and/or the POS application 918—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1008(A), to enable a contactless peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 918 and the payment application 1018, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 918, associated with a payment processing platform, on the merchant device 908(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 908(A) can present a QR code, or other transaction code, that can be associated with a peer-to-peer payment platform. The customer can use a camera associated with the user device 1008(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 918, associated with a payment processing platform, on the merchant device 908(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 918 can cause a text message with a resource locator (e.g., uniform resource locator (URL)) that can be associated with a peer-to-peer payment platform to be sent to the user device 1008(A). The customer can interact with the resource locator and, if the customer is already associated with the peer-to-peer payment platform has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/commerce web page of a merchant. The customer can use a camera associated with a customer computing device, such as the user device 1008 (A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 918 of a merchant device 908(A) at a brick-and-mortar store of a merchant to a payment application 1018 of a user device 1008(A) of a customer to enable the customer to participate in a transaction via their own computing device. For instance, in a "scan to pay" example as described above, based on capturing the QR code, or other transaction code, via the user device 1008(A), the payment processing platform can provide transaction data to the peer-to-peer payment platform for presentation via the payment application 1018 on the user device 1008(A), In some examples, the customer can watch items being added to their cart (e.g., via a user interface presented via the payment application). As an item is added to a virtual cart by the merchant—via the POS application 918 on the merchant device 908(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1018 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1008(A) during or after payment of the transaction.

In some examples, based on capturing the QR code, or other transaction code, the payment processing platform can provide transaction data to the peer-to-peer payment platform for presentation via the payment application 1018 on the computing device of the customer, such as the user device 1008(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1018 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 918, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1018 (e.g., instead of a native camera, or other sensor), techniques described herein can utilize an indication of the QR code, or other transaction code, received from the payment application for two-factor authentication to enable more secure payments.

While techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 13:
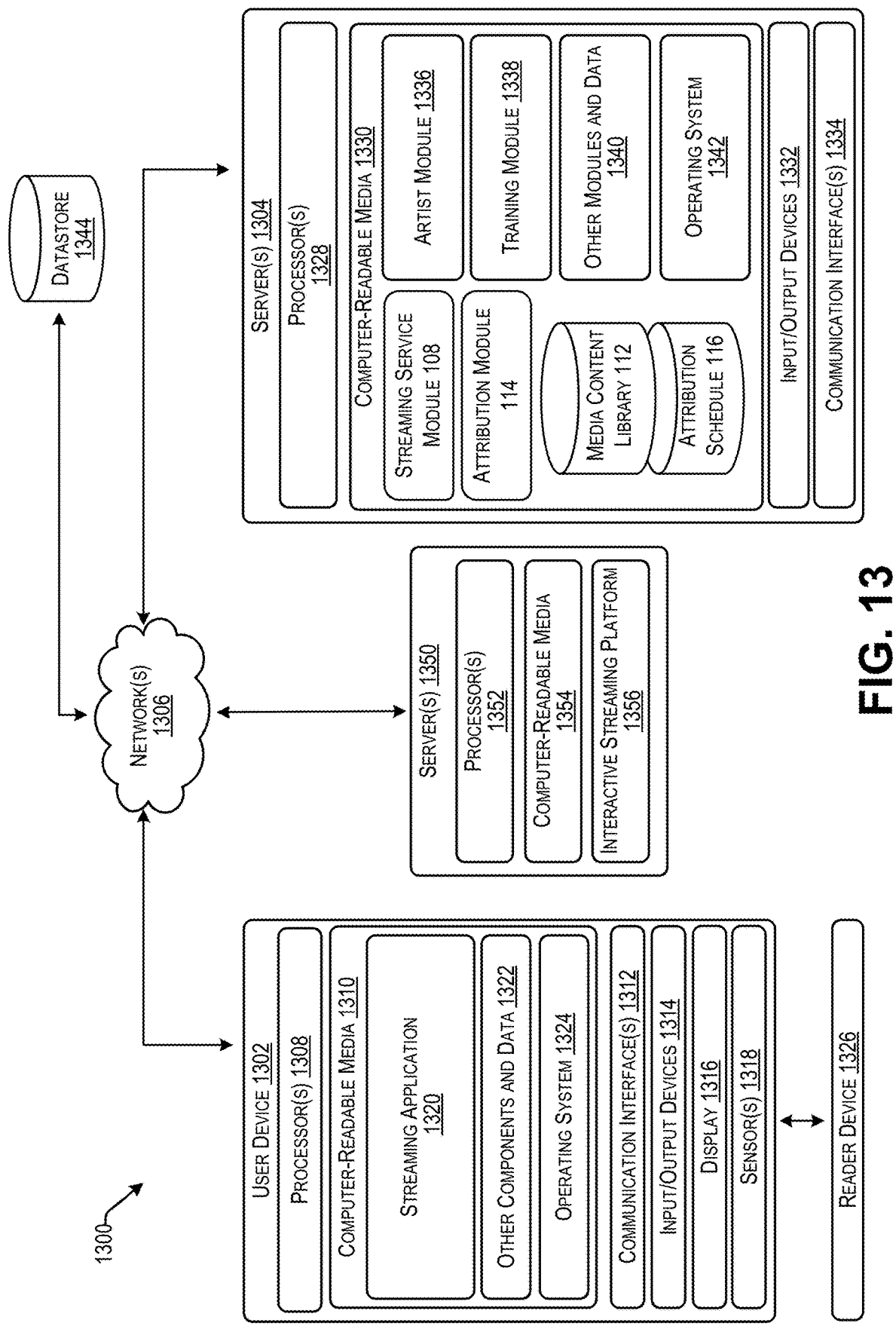
FIG. 13 is a block diagram illustrating an exemplary system architecture that may be implemented for performing techniques as described herein.

FIG. 13 is a block diagram illustrating an exemplary system architecture that may be implemented for performing techniques as described herein. The system 1300 includes a user device 1302 (which may be an example of user device 104 described in FIG. 1), that communicates with server computing device(s) (e.g., streaming service platform 102) via network(s) 1306 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1302 is illustrated, in additional or alternate examples, the system 1300 can have multiple user devices, as described above with reference to FIG. 9.

In at least one example, the user device 1302 can be any suitable type of computing device, e.g., portable, semi-portable, semi-stationary, or stationary. Some examples of the user device 1302 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1302 can be any computing device capable of sending communications and performing the functions according to the techniques described herein. The user device 1302 can include devices, e.g., payment card readers, or components capable of accepting payments, as described below.

In the illustrated example, the user device 1302 includes one or more processors 1308, one or more computer-readable media 1310, one or more communication interface(s) 1312, one or more input/output (I/O) devices 1014, a display 1316, and sensor(s) 1318.

In at least one example, each processor 1308 can comprise one or more processors or processing cores. For example, the processor(s) 1308 can be implemented as one or more microprocessors, microcomputers, microcontrollers, digital signal processors, central processing units, state machines, logic circuitries, and/or any devices that manipulate signals based on operational instructions. In some examples, the processor(s) 1308 can be one or more hardware processors and/or logic circuits of any suitable type specifically programmed or configured to execute the algorithms and processes described herein. The processor(s) 1308 can be configured to fetch and execute computer-readable processor-executable instructions stored in the computer-readable media 1310.

Depending on the configuration of the user device 1302, the computer-readable media 1310 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1310 can include, but is not limited to, RAM, ROM, EEPROM, flash memory, solid-state storage, magnetic disk storage, optical storage, and/or other computer-readable media technology. Further, in some examples, the user device 1302 can access external storage, such as RAID storage systems, storage arrays, network attached storage, storage area networks, cloud storage, or any other medium that can be used to store information and that can be accessed by the processor(s) 1008 directly or through another computing device or network. Accordingly, the computer-readable media 1310 can be computer storage media able to store instructions, components or components that can be executed by the processor(s) 1308. Further, when mentioned, non-transitory computer-readable media exclude media such as energy, carrier signals, electromagnetic waves, and signals per se.

The computer-readable media 1310 can be used to store and maintain any number of functional components that are executable by the processor(s) 1308. In some implementations, these functional components comprise instructions or programs that are executable by the processor(s) 1308 and that, when executed, implement operational logic for performing the actions and services attributed above to the user device 1302. Functional components stored in the computer-readable media 1310 can include components configured to enable users to interact with media content via the user device 1302, and thus the server(s) 1304 and/or other networked devices.

In at least one example, the media content can be presented on the user device via a web browser, or the like. In other examples, the media content can be presented on the user device via a user interface associated with a streaming application 1320, such as a mobile application or desktop application, which can be provided by a service provider associated with the server(s) 1304, or which can be an otherwise dedicated application. In some examples, the streaming application 1320 can be configured to display options for withdrawing funds to make donations (e.g., tips) directly to an artist. The streaming application 1320 may also be configured to surface information about those donations. A user interface associated with the streaming application 1320 can be configured to display, facilitate, or otherwise perform any of the interactions described herein with respect to transactions or other operations as described herein. In at least one example, a user can interact with the user interface via touch input, spoken input, gesture, or any other type of input. The word "input" is also used to describe "contextual" input that may not be directly provided by the user via the streaming application 1320. For example, user's interactions with the streaming application 1320 are analyzed using, e.g., natural language processing techniques, to determine context or intent of the user, which may be treated in a manner similar to "direct" user input.

Depending on the type of the user device 1302, the computer-readable media 1310 can also optionally include other functional components and data, such as other components and data 1322, which can include programs, drivers, etc., and the data used or generated by the functional components. In addition, the computer-readable media 1310 can also store data, data structures and the like, that are used by the functional components. Further, the user device 1302 can include many other logical, programmatic and physical components, of which those described are merely examples that are related to the discussion herein.

In at least one example, the computer-readable media 1310 can include additional functional components, such as an operating system 1324 for controlling and managing various functions of the user device 1302 and for enabling basic user interactions.

The communication interface(s) 1312 can include one or more interfaces and hardware components for enabling communication with various other devices, such as over the network(s) 1306 or directly. For example, communication interface(s) 1312 can enable communication through one or more network(s) 1306, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Functionality disclosed herein may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1302 can further include one or more input/output (I/O) devices 1014. The I/O devices 1314 can include speakers, a microphone, a camera, and various user controls (e.g., buttons, a joystick, a keyboard, a keypad, etc.), a haptic output device, and so forth. The I/O devices 1314 can also include attachments that leverage the accessories (audio-jack, USB-C, Bluetooth, etc.) to connect with the user device 1302.

In at least one example, user device 1302 can include a display 1316. Depending on the type of computing device(s) used as the user device 1302, the display 1316 can employ any suitable display technology. For example, the display 1316 can be a liquid crystal display, a plasma display, a light emitting diode display, an OLED (organic light-emitting diode) display, an electronic paper display, or any other suitable type of display able to present digital content thereon. In at least one example, the display 1316 can be an augmented reality display, a virtually reality display, or any other display able to present and/or project digital content. In some examples, the display 1316 can have a touch sensor associated with the display 1316 to provide a touchscreen display configured to receive touch inputs for enabling interaction with a graphic interface presented on the display 1316. Accordingly, implementations herein are not limited to any particular display technology. Alternatively, in some examples, the user device 1302 may not include the display 1316, and information can be presented by other means, such as aurally, haptically, etc.

In addition, the user device 1302 can include sensor(s) 1318. The sensor(s) 1318 can include a GPS device able to indicate location information. Further, the sensor(s) 1318 can include, but are not limited to, an accelerometer, gyroscope, compass, proximity sensor, camera, microphone, and/or a switch.

In some examples, the GPS device can be used to identify a location of a user. In at least one example, the location of the user can be used by the service provider 912, described above, to provide one or more services. That is, in some examples, the service provider 912 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1314 and/or for sending users 1314 notifications regarding available appointments with merchant(s) located proximate to the users 1314. In at least one example, location can be used for taking payments from nearby customers when they leave a geofence, or location can be used to initiate an action responsive to users 1314 enter a brick-and-mortar store of a merchant. Location can be used in additional or alternative ways as well.

Additionally, the user device 1302 can include various other components that are not shown, examples of which include removable storage, a power source, such as a battery and power control unit, a barcode scanner, a printer, a cash drawer, and so forth.

In addition, in some examples, the user device 1302 can include, be connectable to, or otherwise be coupled to a reader device 1326, for reading payment instruments and/or identifiers associated with payment objects. In some examples, as described above, the reader device 1326 can plug in to a port in the user device 1302, such as a microphone port, a headphone port, an audio-jack, a data port, or other suitable port. In additional or alternative examples, the reader device 1326 can be coupled to the user device 1302 via another wired or wireless connection, such as via a Bluetooth®, BLE, and so on. The reader device 1326 can include a read head for reading a magnetic strip of a payment card, and further can include encryption technology for encrypting the information read from the magnetic strip. Additionally, or alternatively, the reader device 1326 can be an EMV payment reader, which in some examples, can be embedded in the user device 1302. Moreover, numerous other types of readers can be employed with the user device 1302 herein, depending on the type and configuration of the user device 1302.

The reader device 1326 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1326 may include hardware implementation, such as slots, magnetic tracks, and rails with one or more sensors or electrical contacts to facilitate detection and acceptance of a payment instrument. That is, the reader device 1326 may include hardware implementations to enable the reader device 1326 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally, or optionally, the reader device 1326 may also include a biometric sensor to receive and process biometric characteristics and process them as payment instruments, given that such biometric characteristics are registered with the payment service 104 and connected to a financial account with a bank server.

The reader device 1326 may include processing unit(s), computer-readable media, a reader chip, a transaction chip, a timer, a clock, a network interface, a power supply, and so on. The processing unit(s) of the reader device 1326 may execute one or more components and/or processes to cause the reader device 1326 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess a separate local memory, which also may store program components, program data, and/or one or more operating systems. Depending on the exact configuration and type of the reader device 1326, the computer-readable media may include volatile memory (such as RAM), non-volatile memory (such as ROM, flash memory, miniature hard drive, memory card, or the like), or some combination thereof. In at least one example, the computer-readable media of the reader device 1326 may include at least one component for performing various functions as described herein.

The reader chip may perform functionalities to control the operations and processing of the reader device 1326. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1312, which may provide a clock signal indicating a time. Furthermore, the reader chip may perform functionality to control the network interface, which may interface with the network(s) 1306, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1326. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

In some examples, the reader chip may have a separate processing unit(s) and computer-readable media and/or the transaction chip may have a separate processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1302, which can be a POS terminal, and the reader device 1326 are shown as separate devices, in additional or alternative examples, the user device 1302 and the reader device 1326 can be part of a single device, which may be a battery-operated device. In such an example, components of both the user device 1302 and the reader device 1326 may be associated with the single device. In some examples, the reader device 1326 can have a display integrated therewith, which can be in addition to (or as an alternative of) the display 1316 associated with the user device 1302.

The server(s) 1304 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used. The servers 1304 may be an example of the computing devices on which the streaming service platform 102 is implemented as described in FIG. 1.

Further, while the figures illustrate the components and data of the server(s) 1304 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1004 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1304 can include one or more processors 1028, one or more computer-readable media 1330, one or more I/O devices 1332, and one or more communication interfaces 1334. Each processor 1328 can be a single processing unit or a number of processing units and can include single or multiple computing units or multiple processing cores. The processor(s) 1328 can be implemented as one or more microprocessors, microcomputers, microcontrollers, digital signal processors, central processing units, state machines, logic circuitries, and/or any devices that manipulate signals based on operational instructions. For example, the processor(s) 1328 can be one or more hardware processors and/or logic circuits of any suitable type specifically programmed or configured to execute the algorithms and processes described herein. The processor(s) 1328 can be configured to fetch and execute computer-readable instructions stored in the computer-readable media 1330, which can program the processor(s) 1328 to perform the functions described herein.

The computer-readable media 1330 can include volatile and nonvolatile memory and/or removable and non-removable media implemented in any type of technology for storage of information, such as computer-readable instructions, data structures, program components, or other data. Such computer-readable media 1330 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1304, the computer-readable media 1330 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1330 can be used to store any number of functional components that are executable by the processor(s) 1328. In many implementations, these functional components comprise instructions or programs that are executable by the processors 1328 and that, when executed, specifically configure the one or more processors 1328 to perform the actions attributed above to the service provider 912 and/or payment processing service. Functional components stored in the computer-readable media 1330 can optionally include a streaming service module 108, an attribution module 114, an artist module 1336, a training module 1338, and one or more other modules and data 1340. As described in relation to FIG. 1, the computer-readable media 1030 can also include a media content library 112 or attribution schedule 116.

A streaming service module 108 may be configured to receive requests for media content from a user device, retrieve the requested media content from a media content library, and provide that media content to the user device in response to the request. Additionally, the streaming service module 108 may be configured to receive information about various interactions that a user has performed in relation to the media content and determine, based on characteristics of those interactions, an intent of the user in relation to the provided media content. The streaming service module 108 may include a trained machine learning model that has been trained by a training module 1338 to correlate characteristics of interactions with various intent values.

An attribution module 114 may be configured to receive an indication of an intent attributed to one or more media content items and to update an attribution schedule based on that intent. The attribution module 114 may be configured to increase or decrease a portion of funds to be allocated to one or more particular artists based on the intent attributable to those artists (or at least media content items created by those artists). Additionally, the attribution module 114 may be further configured to generate instructions to be provided to one or more account management providers to cause funds to be transferred to accounts associated with various artists.

The artist module 1336 can be configured to receive transaction data from POS systems, such as the POS system 924 described above with reference to FIG. 9. The artist module 1336 can transmit requests (e.g., authorization, capture, settlement, etc.) to payment service server computing device(s) to facilitate POS transactions between artists and customers. The artist module 1336 can communicate the successes or failures of the POS transactions to the POS systems.

The training module 1338 can be configured to train models using machine-learning mechanisms. For example, a machine-learning mechanism can analyze training data to train a data model that generates an output, which can be, as described elsewhere, a intent that includes a numeric data value. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1302 and/or the server(s) 1304 for use at a time after the data models have been trained (e.g., at runtime).

The one or more other modules and data 1340 can include programs, drivers, etc., and the data used or generated by the functional components, the functionality of which is described, at least partially, above. Further, the one or more other modules and data 1340 can include programs, drivers, etc., and the data used or generated by the functional components. Further, the server(s) 1304 can include many other logical, programmatic and physical components, of which those described above are merely examples that are related to the discussion herein.

The one or more "modules" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In additional and/or alternative examples, the module(s) may be implemented as computer-readable instructions, various data structures, and so forth via at least one processing unit to configure the computing device(s) described herein to execute instructions and to perform operations as described herein.

In some examples, a module may include one or more application programming interfaces (APIs) to perform some or all of the functionality (e.g., operations) described herein. In at least one example, a software developer kit (SDK) can be provided by the service provider to allow third-party developers to include service provider functionality and/or avail service provider services in association with their own third-party applications. Additionally, or alternatively, in some examples, the service provider can utilize an SDK to integrate third-party service provider functionality into one or more applications. That is, API(s) and/or SDK(s) can enable third-party developers to customize how their respective third-party applications interact with the service provider or vice versa.

The computer-readable media 1330 can additionally include an operating system 1042 for controlling and managing various functions of the server(s) 1304.

The communication interface(s) 1334 can include one or more interfaces and hardware components for enabling communication with various other devices, such as over the network(s) 1306 or directly. For example, communication interface(s) 1334 can enable communication through one or more network(s) 1306, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1302 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1304 can further be equipped with various I/O devices 1332. Such I/O devices 1332 can include a display, various user interface controls (e.g., buttons, joystick, keyboard, mouse, touch screen, biometric or sensory input devices, etc.), audio speakers, connection ports and so forth.

In at least one example, the system 1300 can include a datastore 1344 that can be configured to store data that is accessible, manageable, and updatable. In some examples, the datastore 1344 can be integrated with the user device 1302 and/or the server(s) 1304. In other examples, as shown in FIG. 13, the datastore 1344 can be located remotely from the server(s) 1304 and can be accessible to the server(s) 1304. The datastore 1344 can comprise multiple databases and/or servers connected locally and/or remotely via the network(s) 1306.

In at least one example, the datastore 1344 can store user profiles, which can include artist profiles, customer profiles, and so on.

Artist profiles can store, or otherwise be associated with, data associated with artists. For instance, an artist profile can store, or otherwise be associated with, information about an artist (e.g., name of the artist, geographic location of the artist, operating hours of the artist, employee information, etc.), an artist category classification (MCC), item(s) offered for sale by the artist, hardware (e.g., device type) used by the artist, transaction data associated with the artist (e.g., transactions conducted by the artist, payment data associated with the transactions, items associated with the transactions, descriptions of items associated with the transactions, itemized and/or total spends of each of the transactions, parties to the transactions, dates, times, and/or locations associated with the transactions, etc.), loan information associated with the artist (e.g., previous loans made to the artist, previous defaults on said loans, etc.), risk information associated with the artist (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The artist profile can securely store bank account information as provided by the artist. Further, the artist profile can store payment information associated with a payment instrument linked to a stored balance of the artist, such as a stored balance maintained in a ledger by the service provider 912.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled)

appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the account(s) can include or be associated with the artist profiles and/or customer profiles described above.

Furthermore, in at least one example, the datastore 1344 can store inventory database(s) and/or catalog database(s). As described above, an inventory can store data associated with a quantity of each item that an artist has available to the artist. Furthermore, a catalog can store data associated with items that an artist has available for acquisition. The datastore 1344 can store additional or alternative types of data as described herein.

A server(s) 1350 can include one or more processors 1352, one or more computer-readable media 1354, and a streaming service platform 1356. Each processor 1352 can be a single processing unit or a number of processing units and can include single or multiple computing units or multiple processing cores. The processor(s) 1352 can be implemented as one or more microprocessors, microcomputers, microcontrollers, digital signal processors, central processing units, state machines, logic circuitries, and/or any devices that manipulate signals based on operational instructions. For example, the processor(s) 1352 can be one or more hardware processors and/or logic circuits of any suitable type specifically programmed or configured to execute the algorithms and processes described herein. The processor(s) 1352 can be configured to fetch and execute computer-readable instructions stored in the computer-readable media 1354, which can program the processor(s) 1352 to perform the functions described herein.

The computer-readable media 1354 can include volatile and nonvolatile memory and/or removable and non-removable media implemented in any type of technology for storage of information, such as computer-readable instructions, data structures, program modules, or other data. Such computer-readable media 1354 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1350, the computer-readable media 1354 can be a type of computer-readable storage media and/or can be a tangible non-transitory media to the extent that when mentioned, non-transitory computer-readable media exclude media such as energy, carrier signals, electromagnetic waves, and signals per se.

In operation, server 1350 hosts the streaming service platform 1356 that can transmit/receive data with the communication interface 1312 displayed on the user device 1302. The streaming service platform 1356 can stream media (e.g., audio and/or video) to the user device 1302. The streaming service platform 1356 also establishes a communication session between user devices 1302 via the communication interface 1312.

Figure 14:
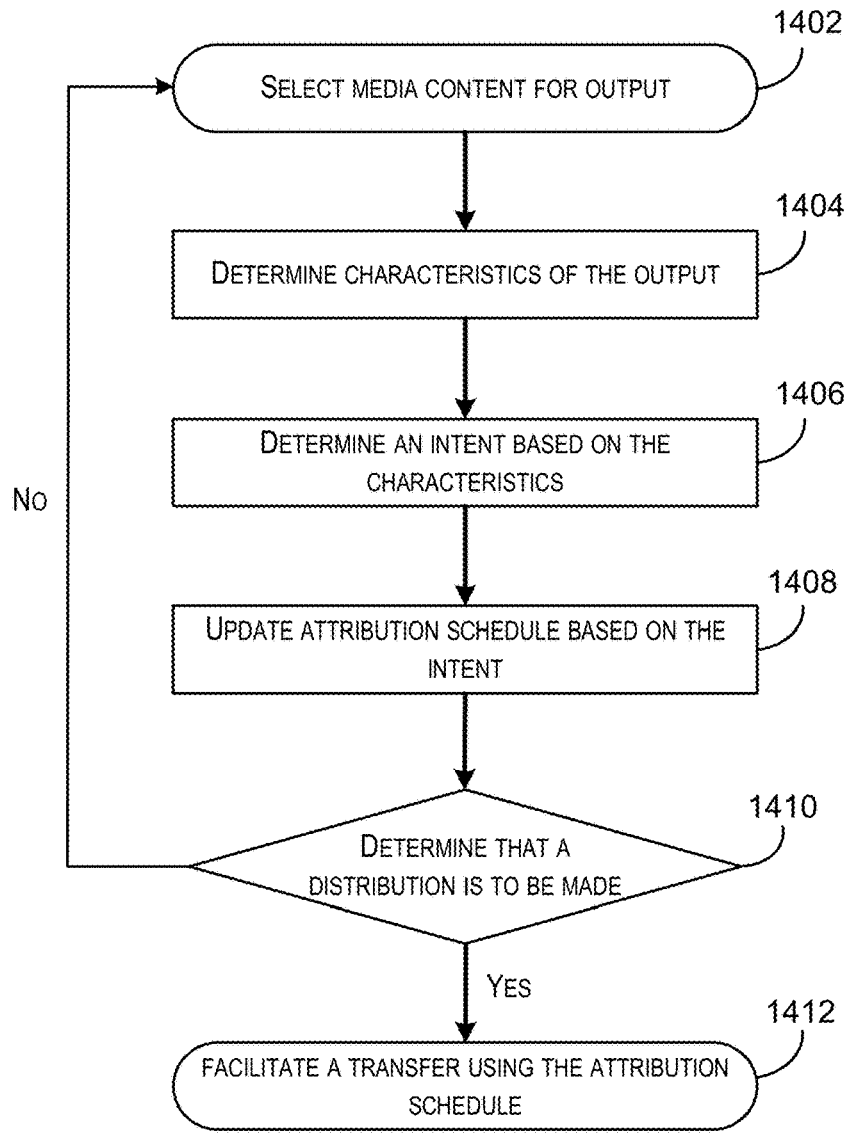
FIG. 14 is a flow diagram illustrating a process for providing dynamic distribution of funds according to intent associated with media content as described herein.

FIG. 14 depicts a flow diagram illustrating a process for providing dynamic distribution of funds according to intent associated with media content as described herein. The process 1400 may be performed by a streaming service platform, such as the streaming service platform 102 as described in FIG. 1.

At 1402, the process 1400 may involve generating first data indicating media content selected for output on a user device. The media content may be one of an audio file, an image file, or a video file. Such media content may be provided to the user device in response to receiving a request for the media content from the user device.

At 1404, the process 1400 may involve determining characteristics of the output of the media content. The characteristics of the output may be determined based on one or more interactions performed by a user associated with the user account in relation to the media content. In some cases, the interaction data may include an indication of a selection of the media content by a user of the user device. In some cases, the interaction data may include an indication of one or more actions taken by a user of the user device while the media content item is presented on the user device. In some cases, the interaction data may include an indication of a rating assigned to the media content by a user of the user device.

At 1406, the process 1400 may involve determining, based on the characteristics of the output of the media content, an intent of the user in association with the media content. The intent associated with the user account in relation to the first data may be a data value representing a determined level of interest of a user associated with the user account in the first data. In some cases, such a data value may be calculated based on one or more selection methods used by the user to access the media content within the period of time. In some cases, such a data value is calculated based on one or more actions taken by the user during presentation of the media content.

At 1408, the process 1400 may involve generating an attribution schedule based on the determined intent. The attribution schedule may be stored in relation to a user account and indicates an amount of fees to be attributed to at least one entity. The attribution schedule may be updated each time that media content is selected for output in association with the user account.

At 1410, the process 1400 may involve making a determination as to whether a distribution is to be made. This may involve determining that a period of time has elapsed. In some cases, the transfer of funds is facilitated after a period of time that comprises a billing period associated with the system. If a determination is made that a distribution is to be made, then the process may continue to 1412. Otherwise, the process may return to 1402 in order to continue to update the attribution schedule as a user continues to consumer media content.

At 1412, the process 1400 may involve facilitating a transfer of funds to an entity account utilizing the attribution schedule. An amount associated with the transfer of funds to the entity may be calculated based on a comparison of the intent to at least one second intent associated with at least one second media content. For example, the amount of fees may be a portion of subscriber fees associated with the user account. Once the transfer has been completed, the process 1400 may further involve zeroing out, or resetting, data values included in the attribution schedule.

The process 1400 may further involve providing, by the streaming service platform to the user device, a request for a tip. In some cases, such a request is provided upon detecting that the user has selected an interactive element on a UI associated with tipping. In some cases, such a request may be provided upon determining that the user has consumed over a threshold number of media content items or has been consuming media content for more than a threshold amount of time. In some cases, such a request may include an indication of a distribution of funds that illustrates a proposal as to how a tipped amount is to be distributed amongst the media content that the user has consumed. In such cases, the portion of that tip to be associated with each media content consumed by the user during a period of time is based on the attribution schedule. In some cases, the user may remove or add media content items from the indicated distribution of funds as well as increase or decrease a portion to be distributed to any media content item. The streaming service platform may receive, from the user device, a request to attribute an amount of funds in response to the request for the tip. In other words, the user may indicate a particular amount to be tipped. Upon receiving such an indication, the process may further involve updating the attribution schedule based on the request, such that the indicated amount is distributed according to the distribution of funds (as updated by the user).

Figure 15:
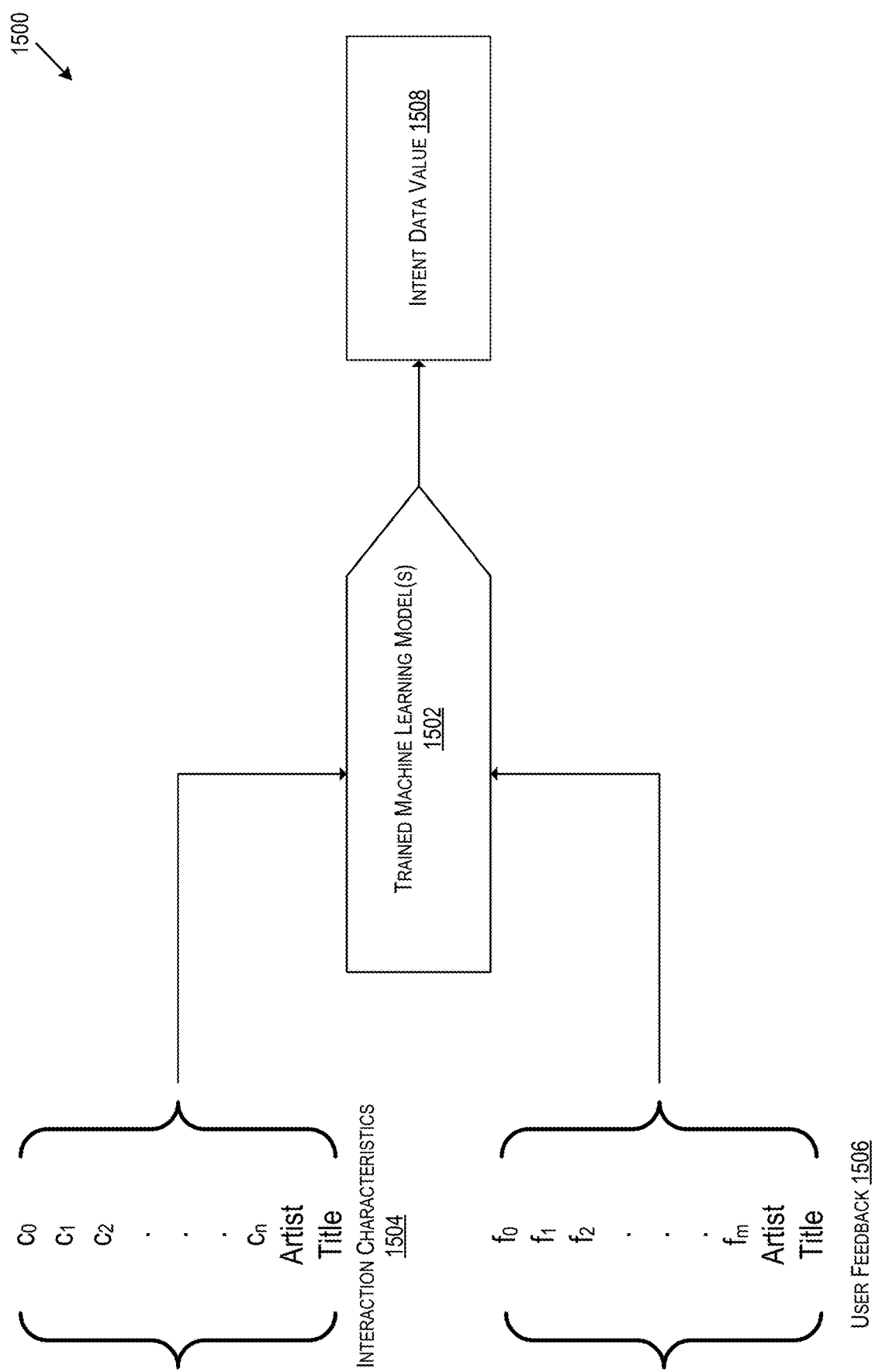
FIG. 15 is a conceptual diagram of an example of a trained machine learning model that can be implemented to accept interaction characteristic information and feedback information for generating an intent value as described herein.

FIG. 15 is a conceptual diagram of an example of a trained machine learning model 1502 that can be implemented to accept interaction characteristic information 1504 and feedback information 1506 for generating an intent value 1508 as described herein.

As described above, interaction characteristic information 1504 (e.g., $c_0$-$c_n$) may be collected by a streaming application installed upon, and executed from, a user device. In such cases, the characteristic data may include characteristics of one or more interactions between a user of the user device and the streaming application on the user device. The characteristic information 1504 may be collected in association with a particular media content item. In such cases, the media content item may be identified via a unique identifier, uniform resource locator, an artist and/or title, or any other suitable identifying information. In some cases, such information may be obtained from metadata appended to the media content item.

The interaction characteristic information 1504 may include representations of characteristics, such as numbers, symbols, etc. With respect to the characteristics themselves, examples of some characteristics may include a level of volume at which the related media content is consumed, a speed at which the media content is consumed, a number of times that the media content has been consumed, various actions performed by the user while the media content is consumed (e.g., skipped, repeated, etc.) or any other characteristic that can be collected by the user device in relation to the consumption (e.g., presentation) of media content.

Based on the interaction characteristics 1504 being provided to the trained machine learning model as input, the trained machine learning model may then output an intent value 1508, which may be a number or other representation of an intent (e.g., a level of interest of the user) determined for the media content item.

In addition to the interaction characteristic information 1504, user feedback 1506 may be further provided to the trained machine learning model 1502. Like the interaction characteristics 1504, the user feedback 1506 (e.g., $f_0$-$f_m$) may include representations of the feedback, such as numbers, symbols, etc. The user feedback 1506 may also be collected in association with a particular media content item. In such cases, the media content item may be identified via the respective identifying information as noted above.

With respect to the user feedback 1506, such data may indicate any indication of a user's interest in a particular media content item as provided by the user. For example, the user feedback 1506 may include a rating or other suitable ranking assigned to the media content item by the user. In another example, the user feedback 1506 may include an indication that the user has added the media content item to a "favorites" list or alternatively that the user has requested not to be presented the media content again. In another example, the user may be presented with a representation of an intent value 1508 as calculated by the trained machine learning model 1502 and may provide, in response to that presentation an indication as to the accuracy of the calculated intent value 1508.

Upon receiving the user feedback 1506, the trained machine learning model 1502 may generate or update the intent value 1508. The user feedback 1506 may be received at a different time than the interaction characteristics 1504 are received. As user feedback is received, that user feedback may be combined with any interaction characteristic data 1504 in order to generate a more holistic intent value 1508. Such an intent value 1508 may be updated as new user feedback 106 is received. Interaction characteristic data 1504 and/or user feedback 106 received within a predetermined period of time (e.g., within 30 minutes of the media content item being consumed) is used to generate the intent value 1508.

The phrases "in some examples," "according to various examples," "in the examples shown," "in one example," "in other examples," "various examples," "some examples," and the like generally mean the particular feature, structure, or characteristic following the phrase is included in at least one example of the present invention and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. One or more blocks of the process can be omitted entirely. Moreover, the methods can be combined in whole or in part with each other or with other methods.

The foregoing is merely illustrative of the principles of this disclosure and various modifications can be made by those skilled in the art without departing from the scope of this disclosure. The above-described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter is not to be limited to any single example described herein, but rather is to be construed in breadth and scope in accordance with the appended claims.

Disclosed are methods and systems to provide a streaming service platform that allows communication sessions and payments to an artist based on user-centric royalty models and additional payment requests by users including a method that comprises: determining characteristics of the output of media content selected for output in association with a user account over a period of time, determining, based on the characteristics of the output, an intent associated with the user account in relation to the media content, and generating an attribution schedule indicating a degree of attribution for the entity based on the determined intent. The method may further comprise determining that the period of time has lapsed and facilitating a transfer of funds to an entity account associated with the entity utilizing the attribution schedule and based on the period of time lapsing.

Example Clauses

1. A method comprising:
generating first data indicating media content selected for output in association with a user account over a period of time;
determining characteristics of the output of the media content, the characteristics indicating at least an entity associated with the media content and how the media content was output in relation to other media content output in association with the user account over the period of time;
determining, based on the characteristics of the output, second data indicating an intent value associated with the user account in relation to the first data;
generating third data representing an attribution schedule indicating a degree of attribution for the entity based on the intent value;
determining that the period of time has lapsed; and
facilitating a transfer of funds to an entity account associated with the entity using the third data and based on the period of time lapsing.

2. The method of clause 1, further comprising determining a data value representing a determined level of interest of a user associated with the user account in the first data; and
assigning the data value to the intent associated with the user account in relation to the first data.

3. The method of clause 2, wherein the data value is calculated based on one or more selection methods used by the user to access the media content within the period of time.

4. The method of clause 2, wherein the data value is calculated based on one or more actions taken by the user during presentation of the media content.

5. The method of clause 1, wherein an amount associated with the transfer of funds to the entity is calculated based on a comparison of the intent to at least one second intent associated with at least one second media content.

6. The method of clause 1, wherein the characteristics of the output are determined based on one or more interactions performed by a user associated with the user account in relation to the media content.

7. A streaming service platform comprising:
one or more processors; and
non-transitory computer-readable media storing instructions that, when executed by the one or more processors, cause the one or more processors to perform operations comprising:
generating first data indicating media content selected for output to a user device;
determining characteristics of the output of the media content related to how the media content was output by the user device;
determining, based on the characteristics of the output, a second data indicating an intent associated with the media content;
updating a third data representing an attribution schedule indicating a degree of attribution for one or more entity based on the intent; and
facilitating a transfer of funds to an account associated with the one or more entity based on the third data.

8. The system of clause 7, wherein the media content comprises one of an audio file, an image file, or a video file, and wherein the intent associated with the media content is determined based on a type of the media content.

9. The system of clause 7, the attribution schedule is stored in relation to a user account and indicates an amount of fees to be attributed to at least one entity.

10. The system of clause 9, wherein the attribution schedule is updated each time that media content is selected for output in association with the user account.

11. The system of clause 7, further comprising:
providing, to the user device, a request for a tip comprising an indication of a distribution of funds, a portion of which is to be associated with the media content based on the attribution schedule.

12. The system of clause 11, further comprising:
receiving, from the user device, a request to attribute an amount of funds in response to the request for the tip; and
updating the attribution schedule based on the request, such that the amount is distributed according to the indication of the distribution of funds.

13. A method comprising:
providing, to a user device, a media content item to be presented on the user device;
receiving, from the user device, interaction data indicating one or more actions taken by a user of the user device in relation to the media content item;
determining, based on the characteristics of the interaction data, an intent to be attributed to the media content item in relation to the user;
updating, based on the intent, an attribution schedule indicating one or more accounts; and causing a distribution to be made to the one or more accounts based on the attribution schedule.

14. The method of clause 13, wherein the media content is provided to the user device in response to receiving a request for the media content from the user device.

15. The method of clause 13, wherein the interaction data comprises an indication of a selection of the media content by a user of the user device.

16. The method of clause 13, wherein the interaction data comprises an indication of one or more actions taken by a user of the user device while the media content item is presented on the user device.

17. The method of clause 13, wherein the interaction data comprises an indication of a rating assigned to the media content by a user of the user device.

18. The method of clause 13, the distribution is caused to be made to the one or more accounts based on a period of time lapsing.

19. The method of clause 13, further comprising:
providing, to the user device, a second media content item to be presented on the user device;
receiving, from the user device, second interaction data relating to the second media content item;
determining a second intent based on the second interaction data; and
updating the attribution schedule based on the second intent.

20. The method of clause 13, further comprising resetting the attribution schedule once the distribution is caused to be made to the one or more accounts.

What is claimed is:

1. A streaming service platform comprising:
one or more processors; and
non-transitory computer-readable media storing an attribution schedule and instructions that, when executed by the one or more processors, cause the one or more processors to perform operations comprising:
receiving a selection of media content to output to a user device associated with a user account;
providing the media content to the user device to be presented on the user device;
determining characteristics of the output of the media content related to how the media content was output by the user device;
determining, based on the characteristics of the output of the media content, an intent value associated with the media content;
updating the attribution schedule indicating at least a change of a degree of attribution for one or more entities based on the intent value; and
facilitating a transfer of funds from the user account to an account associated with the one or more entities based on the attribution schedule.

2. The streaming service platform of claim 1, wherein the media content comprises one of an audio file, an image file, or a video file, and wherein the intent value associated with the media content is determined based on a type of the media content.

3. The streaming service platform of claim 1, the attribution schedule is stored in relation to the user account and indicates an amount of fees to be attributed to the one or more entities.

4. The streaming service platform of claim 1, wherein the attribution schedule is updated each time that media content is selected for output in association with the user account.

5. The streaming service platform of claim 1, wherein the instructions further cause the one or more processors to perform operations comprising:
providing, to the user device, a request for a tip comprising an indication of a distribution of second funds, a portion of which is to be associated with the media content based on the attribution schedule.

6. The streaming service platform of claim 5, wherein the instructions further cause the one or more processors to perform operations comprising:
receiving, from the user device, a request to attribute an amount of the second funds in response to the request for the tip; and
updating the attribution schedule based on the request to attribute the amount of the second funds, such that the amount of the second funds is distributed according to the indication.

7. The streaming service platform of claim 1, wherein the instructions further cause the one or more processors to perform operations comprising:
determining whether a time period associated with the attribution schedule has elapsed; and
in response to the time period associated with the attribution schedule has elapsed, determining respective amount of fees for each of the one or more entities based at least in part on attribution fees accumulated during the time period, and transferring the respective amount of fees to each of the one or more entities;
in response to the time period associated with the attribution schedule has not elapsed, and
monitoring the media content and additional media content that are output to the user device.

8. The streaming service platform of claim 1, wherein the characteristics of the output of the media content include at least one of:
skipping play of the media content,
repeating play of the media content,
increasing a play speed of the media content,
decreasing a play speed of the media content,
increasing a play volume of the media content,
decreasing a play volume of the media content,
providing a ranking of the media content,
adding the media content to a collection or a playlist, or
select a "like" icon associated with the media content.

9. The streaming service platform of claim 1, wherein determining, based on the characteristics of the output of the media content, an intent value associated with the media content further comprises:
determining, using a machine learning model, to generate the intent value based at least in part on the characteristics of the output of the media content,
wherein the machine learning model is trained using historical user interactions with at least second media content and historical intent values.

10. A method comprising:
receiving, by at least one processor of a streaming service platform, a selection of media content to output to a user device associated with a user account, the media content being provided through a streaming service platform;
providing, by the at least one processor of the streaming service platform, the media content to the user device to be presented on the user device;
determining, by the at least one processor of the streaming service platform, characteristics of the output of the media content related to how the media content was output by the user device;

determining, by the at least one processor of the streaming service platform and based on the characteristics of the output of the media content, an intent value associated with the media content;

updating, by the at least one processor of the streaming service platform, an attribution schedule indicating at least a change of a degree of attribution for one or more entities based on the intent value; and facilitating, by the at least one processor of the streaming service platform, a transfer of funds from the user account to an account associated with the one or more entities based on the attribution schedule.

11. The method of claim 10, wherein the media content comprises one of an audio file, an image file, or a video file, and wherein the intent value associated with the media content is determined based on a type of the media content.

12. The method of claim 10, wherein the attribution schedule is stored in relation to the user account and indicates an amount of fees to be attributed to the one or more entities.

13. The method of claim 10, wherein the attribution schedule is updated each time that media content is selected for output in association with the user account.

14. The method of claim 10, further comprising:
providing, by the at least one processor of the streaming service platform and to the user device, a request for a tip comprising an indication of a distribution of second funds, a portion of which is to be associated with the media content based on the attribution schedule.

15. The method of claim 14, further comprising:
receiving, by the at least one processor of the streaming service platform and from the user device, a request to attribute an amount of the second funds in response to the request for the tip; and updating, by the at least one processor of the streaming service platform, the attribution schedule based on the request to attribute the amount of the second funds, such that the amount of the second funds is distributed according to the indication.

16. The method of claim 10, further comprising:
determining, by the at least one processor of the streaming service platform, whether a time period associated with the attribution schedule has elapsed; and in response to the time period associated with the attribution schedule has elapsed,
determining, by the at least one processor of the streaming service platform, respective amount of fees for each of the one or more entities based at least in part on attribution fees accumulated during the time period, and
transferring, by the at least one processor of the streaming service platform, the respective amount of fees to each of the one or more entities;

in response to the time period associated with the attribution schedule has not elapsed, and
monitoring, by the at least one processor of the streaming service platform, the media content and additional media content that are output to the user device.

17. The method of claim 10, wherein the characteristics of the output of the media content include at least one of:

skipping play of the media content,
repeating play of the media content,
increasing a play speed of the media content,
decreasing a play speed of the media content,
increasing a play volume of the media content,
decreasing a play volume of the media content,
providing a ranking of the media content,
adding the media content to a collection or a playlist, or
select a "like" icon associated with the media content.

18. The method of claim 10, wherein determining, by the at least one processor of the streaming service platform and based on the characteristics of the output of the media content, an intent value associated with the media content further comprises:
determining, by the at least one processor of the streaming service platform and using a machine learning model, to generate the intent value based at least in part on the characteristics of the output of the media content,
wherein the machine learning model is trained using historical user interactions with at least second media content and historical intent values.

19. One or more non-transitory computer-readable media storing instructions that when executed by one or more processors of a streaming service platform, perform operations comprising:
receiving a selection of media content to output to a user device associated with a user account, the media content being provided through a streaming service platform;
providing the media content to the user device to be presented on the user device;
determining characteristics of the output of the media content related to how the media content was output by the user device;
determining, based on the characteristics of the output of the media content, an intent value associated with the media content;
updating an attribution schedule indicating at least a change of a degree of attribution for one or more entities based on the intent value; and
facilitating a transfer of funds from the user account to an account associated with the one or more entities based on the attribution schedule.

20. The one or more non-transitory computer-readable media of claim 19, wherein the instructions that when executed by the one or more processors perform operations comprising:
determining whether a time period associated with the attribution schedule has elapsed; and
in response to the time period associated with the attribution schedule has elapsed,
determining respective amount of fees for each of the one or more entities based at least in part on attribution fees accumulated during the time period, and
transferring the respective amount of fees to each of the one or more entities;
in response to the time period associated with the attribution schedule has not elapsed, and
monitoring the media content and additional media content that are output to the user device.

* * * * *